US010604854B2

(12) United States Patent
Dai et al.

(10) Patent No.: US 10,604,854 B2
(45) Date of Patent: Mar. 31, 2020

(54) HETEROSTRUCTURES FOR ULTRA-ACTIVE HYDROGEN EVOLUTION ELECTROCATALYSIS

(71) Applicant: The Board of Trustees of the Leland Stanford Junior University, Stanford, CA (US)

(72) Inventors: Hongjie Dai, Palo Alto, CA (US); Ming Gong, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 108 days.

(21) Appl. No.: 14/802,931

(22) Filed: Jul. 17, 2015

(65) Prior Publication Data

US 2016/0017507 A1    Jan. 21, 2016

Related U.S. Application Data

(60) Provisional application No. 62/025,900, filed on Jul. 17, 2014.

(51) Int. Cl.
| | |
|---|---|
| *C25B 11/06* | (2006.01) |
| *C25B 11/04* | (2006.01) |
| *C25B 1/04* | (2006.01) |
| *C25B 11/03* | (2006.01) |
| *C25B 1/34* | (2006.01) |
| *C25B 11/12* | (2006.01) |

(52) U.S. Cl.
CPC ............ *C25B 11/0478* (2013.01); *C25B 1/04* (2013.01); *C25B 1/34* (2013.01); *C25B 11/035* (2013.01); *C25B 11/0405* (2013.01); *C25B 11/12* (2013.01); *Y02E 60/366* (2013.01)

(58) Field of Classification Search
CPC .. C25B 1/04; C25B 1/34; C25B 11/00; C25B 11/02; C25B 11/03–11/035; C25B 11/0405; C25B 11/0442; C25B 11/0478; H01M 8/04–8/14; B01J 23/755
USPC ....................................................... 502/337
See application file for complete search history.

(56) References Cited

U.S. PATENT DOCUMENTS

| | | | | |
|---|---|---|---|---|
| 4,722,773 | A * | 2/1988 | Plowman | ................. C25B 1/46 |
| | | | | 204/252 |
| 5,035,789 | A | 6/1991 | Beaver et al. | |
| 6,582,676 | B2 | 6/2003 | Chaklader | |
| 2001/0016282 | A1* | 8/2001 | Kilb | ....................... H01M 4/26 |
| | | | | 429/218.2 |
| 2003/0050196 | A1* | 3/2003 | Hirano | ..................... A61L 9/00 |
| | | | | 507/238 |

(Continued)

FOREIGN PATENT DOCUMENTS

| | | |
|---|---|---|
| CN | 203295617 U | 11/2013 |
| JP | 04-231491 A | 8/1992 |

(Continued)

OTHER PUBLICATIONS

"Devoid", Dictionary.com (Year: 2016).*

(Continued)

*Primary Examiner* — Alexander W Keeling
(74) *Attorney, Agent, or Firm* — Foley & Lardner LLP; Mark J. Danielson

(57) ABSTRACT

A cathode for water splitting production includes: (1) a porous substrate; and (2) an electrocatalyst affixed to the porous substrate. The electrocatalyst includes heterostructures of a first material and a second material that partially covers the first material.

22 Claims, 27 Drawing Sheets

(56) References Cited

U.S. PATENT DOCUMENTS

| | | | |
|---|---|---|---|
| 2007/0082236 A1* | 4/2007 | Lee | B01J 23/16 429/423 |
| 2007/0248887 A1* | 10/2007 | Eskra | H01M 4/70 429/235 |
| 2008/0280190 A1* | 11/2008 | Dopp | B82Y 30/00 429/494 |
| 2009/0092887 A1* | 4/2009 | McGrath | C25B 11/00 429/421 |
| 2009/0321244 A1 | 12/2009 | Smith et al. | |
| 2010/0323274 A1* | 12/2010 | Ueno | H01M 4/90 429/487 |
| 2011/0200915 A1 | 8/2011 | Goto et al. | |
| 2012/0094210 A1* | 4/2012 | Uensal | H01M 4/861 429/483 |
| 2012/0145532 A1 | 6/2012 | Smolyakov et al. | |
| 2012/0315568 A1* | 12/2012 | Lee | C01B 21/0828 429/483 |
| 2013/0180848 A1 | 7/2013 | Lee et al. | |
| 2013/0189580 A1 | 7/2013 | Dai et al. | |
| 2013/0252808 A1 | 9/2013 | Yamazaki et al. | |
| 2014/0116890 A1 | 5/2014 | Subbaraman et al. | |
| 2014/0147377 A1 | 5/2014 | Ho et al. | |
| 2014/0194279 A1* | 7/2014 | Young | H01M 4/242 502/185 |
| 2015/0101923 A1* | 4/2015 | Idriss | C01B 3/042 204/157.52 |

FOREIGN PATENT DOCUMENTS

| | | |
|---|---|---|
| JP | 2001-234380 A | 8/2001 |
| JP | 2009-543674 A | 12/2009 |
| WO | WO-2009/048382 A2 | 4/2009 |
| WO | WO-2013/127920 A1 | 9/2013 |
| WO | WO-2013/185163 A1 | 12/2013 |
| WO | WO-2014/045049 A1 | 3/2014 |
| WO | WO-2014/058984 A2 | 4/2014 |

OTHER PUBLICATIONS

"Devoid", Vocabulary.com (Year: 2012).*

Johnson et al ("Co@CoO@Au core-multi-shell nanocrystals", Journal of Materials Chemistry, 2010, 20, pp. 439-443). (Year: 2010).*

Choi, J. et al. (2008) "Photocatalytic production of hydrogen on Ni/NiO/KNbO$_3$/CdS nanocomposites using visible light," Journal of Materials Chemistry 18:2371-2378.

Damian, A. et al. (2006) "Ni and Ni—Mo Hydrogen Evolution Electrocatalysts Electrodeposited in a Polyaniline Matrix," Journal of Power Sources 158:464-476.

Domen, K. et al. (1986) "Mechanism of Photocatalytic Decomposition of Water into H$_2$ and O$_2$ over NiO—SrTiO(3)," Journal of Catalysis 102:92-98.

Esposito, D.V. et al. (2012) "A New Class of Electrocatalysts for Hydrogen Production from Water Electrolysis: Metal Monolayers Supported on Low-Cost Transition Metal Carbides," Journal of the American Chemical Society 134:3025-3033.

Gao, M. et al. (2014) "Efficient Water Oxidation Using Nanostructured α-Nickel-Hydroxide as an Electrocatalyst," Journal of the American Chemical Society 136:7077-7084.

Gong, M. et al. (2014) "Nanoscale nickel oxide/nickel heterostructure for active hydrogen evolution electrocatalysis," Nature Communications 5:4695,1-6.

Maeda, K. et al. (2006) "Noble-Metal/Cr$_2$O$_3$ Core/Shell Nanoparticles as a Cocatalyst for Photocatalytic Overall Water Splitting," Angewandte Chemie International Edition 45:7806-7809.

Osterloh, F.E. et al. (2013) "Inorganic nanostructures for photoelectrochemical and photocatalytic water splitting," Chem. Soc. Rev. 42:2294-2320.

Xu, Y-F. et al. (2013) "Nickel/Nickel(II) Oxide Nanoparticles Anchored onto Cobalt(IV) Diselenide Nanobelts for the Electrochemical Production of Hydrogen," Angewandte Chemie International Edition 52:8546-8550.

International Search Report and Written Opinion (ISA/KR) for International Application No. PCT/US2015/040890, dated Nov. 23, 2015.

Examination Report issued in IN Application No. 201737001546 dated Sep. 17, 2019, 9 pages.

Office Action with English Translation issued in JP Application No. 2017-502185 dated Jul. 18, 2019.

Communication pursuant to Article 94(3) EPC issued in EP Application No. 15821505.3 dated Feb. 22, 2019, 3 pages.

Extended European Search Report in EP Application No. 15821505. 3, dated Jan. 18, 2018.

First Examination Report issued in Australian Application No. 2015289518 dated Mar. 22, 2019, 3 pages.

Final Official Action on JP Application No. 2017-502185 dated Dec. 25, 2019 11 pages.

* cited by examiner

HETEROSTRUCTURES FOR ULTRA-ACTIVE HYDROGEN EVOLUTION ELECTROCATALYSIS

CROSS-REFERENCE TO RELATED APPLICATION

This application claims the benefit of U.S. Provisional Application No. 62/025,900, filed on Jul. 17, 2014, the disclosure of which is incorporated herein by reference in its entirety.

TECHNICAL FIELD

This disclosure relates to catalysts for hydrogen evolution reaction and, more particularly, heterostructures for catalysis of hydrogen evolution reaction.

BACKGROUND

Hydrogen, as a clean and renewable energy resource, has been intensely investigated as an alternative to the diminishing fossil fuel. An effective way of producing high purity hydrogen is to electrochemically split water into hydrogen and oxygen in an electrolyzer. Nickel (Ni) and stainless steel are typically used in industry for water reduction and oxidation catalysis respectively in basic solutions. However, Ni metal is not an ideal water reduction or hydrogen evolution reaction (HER) catalyst due to its high overpotential (about 200 mV) and large Tafel slope. The state-of-art HER catalyst is platinum (Pt) and its alloys, but the scarcity and cost of Pt restrict its large-scale application for electrolysis. Active and stable non-precious, metal-based HER catalysts in alkaline solutions have been pursued including Raney Ni and Ni-molybdenum (Mo) alloy. However, it remains difficult to achieve both high activity and stability matching those of Pt.

It is against this background that a need arose to develop embodiments of this disclosure.

SUMMARY

Certain aspects of this disclosure relate to an electrode for water splitting production. In some embodiments, the electrode includes: (1) a porous substrate; and (2) an electrocatalyst affixed to the porous substrate. The electrocatalyst includes heterostructures of a first material and a second material that partially covers the first material.

In some embodiments, the first material and the second material include a first metal and a second metal, respectively. In some embodiments, the first metal and the second metal have different oxidation states. In some embodiments, the first metal and the second metal are the same transition metal. In some embodiments, the transition metal is nickel.

In some embodiments, the second material includes a third metal that is different from the first metal and the second metal. In some embodiments, the first metal and the third metal are different transition metals. In some embodiments, the first metal is nickel, the second metal is nickel, and the third metal is chromium.

In some embodiments, the first material includes a metal, and the second material includes a metalloid. In some embodiments, the first material includes two or more different metals. In some embodiments, the second material includes two or more different metals.

In some embodiments, each heterostructure includes a core of the first material and an incomplete shell of the second material partially covering the core of the first material. In some embodiments, the core includes a first metal, and the incomplete shell includes an oxide of a second metal and an oxide of a third metal, and the third metal is different from the first metal and the second metal. In some embodiments, the core includes a first metal, and the incomplete shell includes a mixed oxide of a second metal and a third metal, and the third metal is different from the first metal and the second metal.

In some embodiments, the porous substrate has a porosity in the range of 0.3 to 0.98. In some embodiments, the porous substrate is a metallic foam or a non-metallic foam. In some embodiments, the porous substrate is selected from, for example, a nickel foam, a copper foam, a carbon foam, a graphite foam, a carbon fiber paper, a carbon nanotube network, a graphene foam, a titanium foam, and an aluminum foam. In some embodiments, the porous substrate defines voids, and the electrocatalyst is disposed in the voids of the porous substrate.

Additional aspects of this disclosure relate to a water electrolyzer including the electrode of various embodiments of this disclosure. Additional aspects of this disclosure relate to a chloralkali cell including the electrode of various embodiments of this disclosure.

Further aspects of this disclosure relate to a method of manufacturing an electrode for water splitting production. In some embodiments, the method includes: (1) providing a precursor composition including one or more metals, such as at least two different metals; (2) applying the precursor composition to a porous substrate to form a coated porous substrate; and (3) annealing the coated porous substrate to form heterostructures of the metals affixed to the porous substrate.

In some embodiments, the method further includes applying a polar solvent to the porous substrate, where the polar solvent is applied prior to applying the precursor composition to the porous substrate.

In some embodiments, the method further includes applying a surfactant to the porous substrate, where the surfactant is applied prior to applying the precursor composition to the porous substrate.

In some embodiments, annealing the coated porous substrate is performed at a temperature up to 400° C. and a pressure up to 100 torr.

In some embodiments, the precursor composition is an aqueous composition.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

(c) A schematic illustration of the NiO/Ni-CNT structure. (d-f) Chemical maps for the spatial distribution of Ni and O and their overlay, from the whole area shown in (b). The two dashed circles highlight the NiO particle layer on the surface of the Ni core. (g-i) Linear sweep voltammetry of NiO/Ni-CNT and Pt/C in (g) 1 M KOH (h) $NaHCO_3$—$Na_2CO_3$ buffer (pH=about 10.0) and (i) potassium borate buffer (pH=about 9.5) at a scan rate of about 1 mV/s under the loading of about 0.28 mg/$cm^2$ on a rotating disk electrode (RDE) showing high HER catalytic activity of NiO/Ni-CNT.

Figure 2:
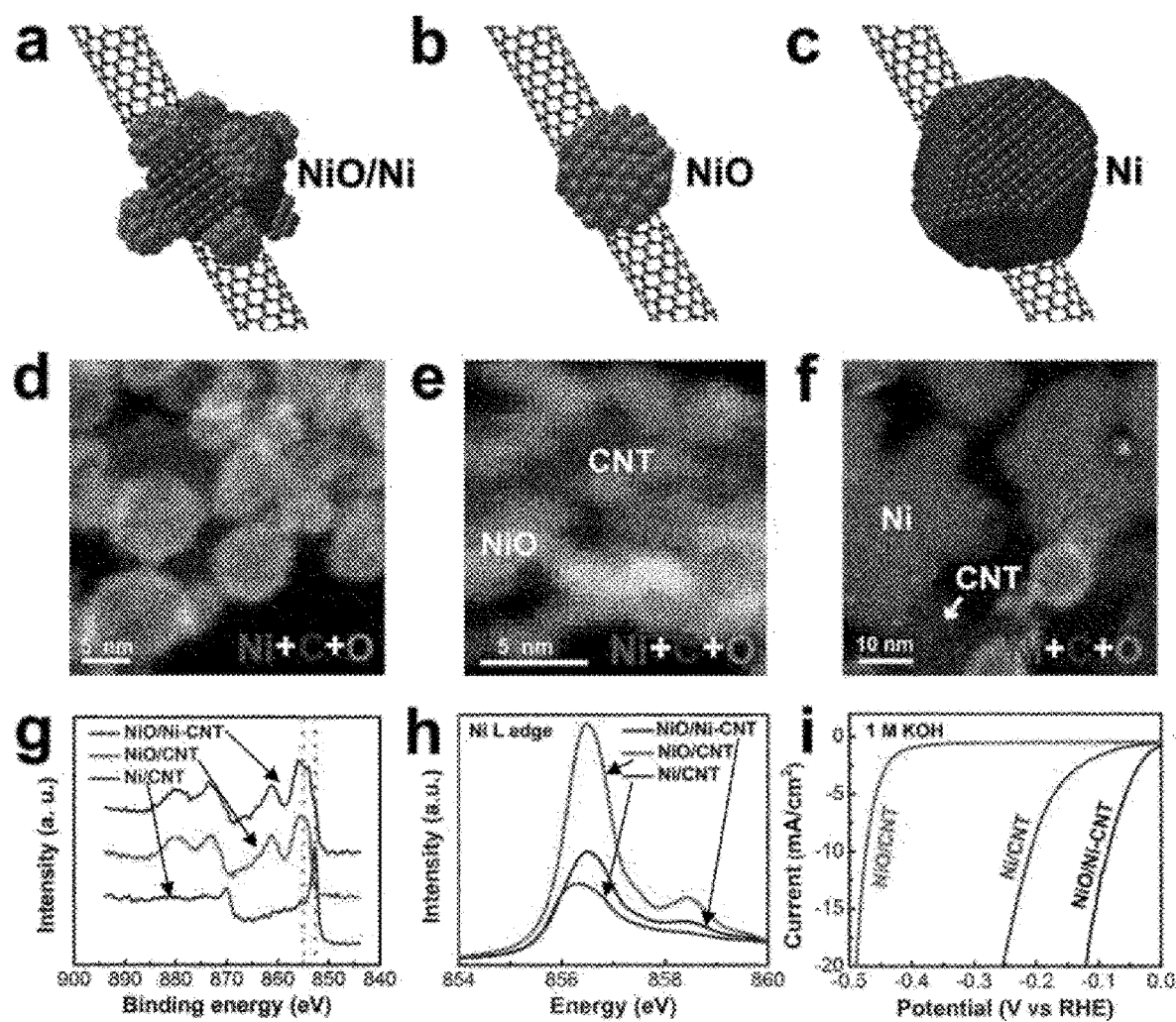

FIG. 2. Structure and performance of NiO/Ni-CNT, NiO/CNT, and Ni/CNT. (a-c) Schematic illustrations of (a) NiO/Ni-CNT, (b) NiO/CNT and (c) Ni/CNT structure. (d-f) Reconstructed elemental maps with Ni, C, and O for (d) NiO/Ni-CNT, (e) NiO/CNT and (f) Ni/CNT structure. (g) High resolution Ni X-ray photoelectron spectroscopy (XPS) spectra of the three hybrid materials (the dotted line points out the binding energy of $Ni^{2+}$ (left line) and metallic Ni (right line). (h) Ni L edge X-ray absorption near edge structure (XANES) spectra of the three hybrid materials. (i) Linear sweep voltammetry of the three hybrid materials in about 1 M KOH at a scan rate of about 1 mV/s under a loading of about 0.28 mg/$cm^2$ on a RDE showing superior HER catalytic activity of NiO/Ni-CNT.

Figure 3:
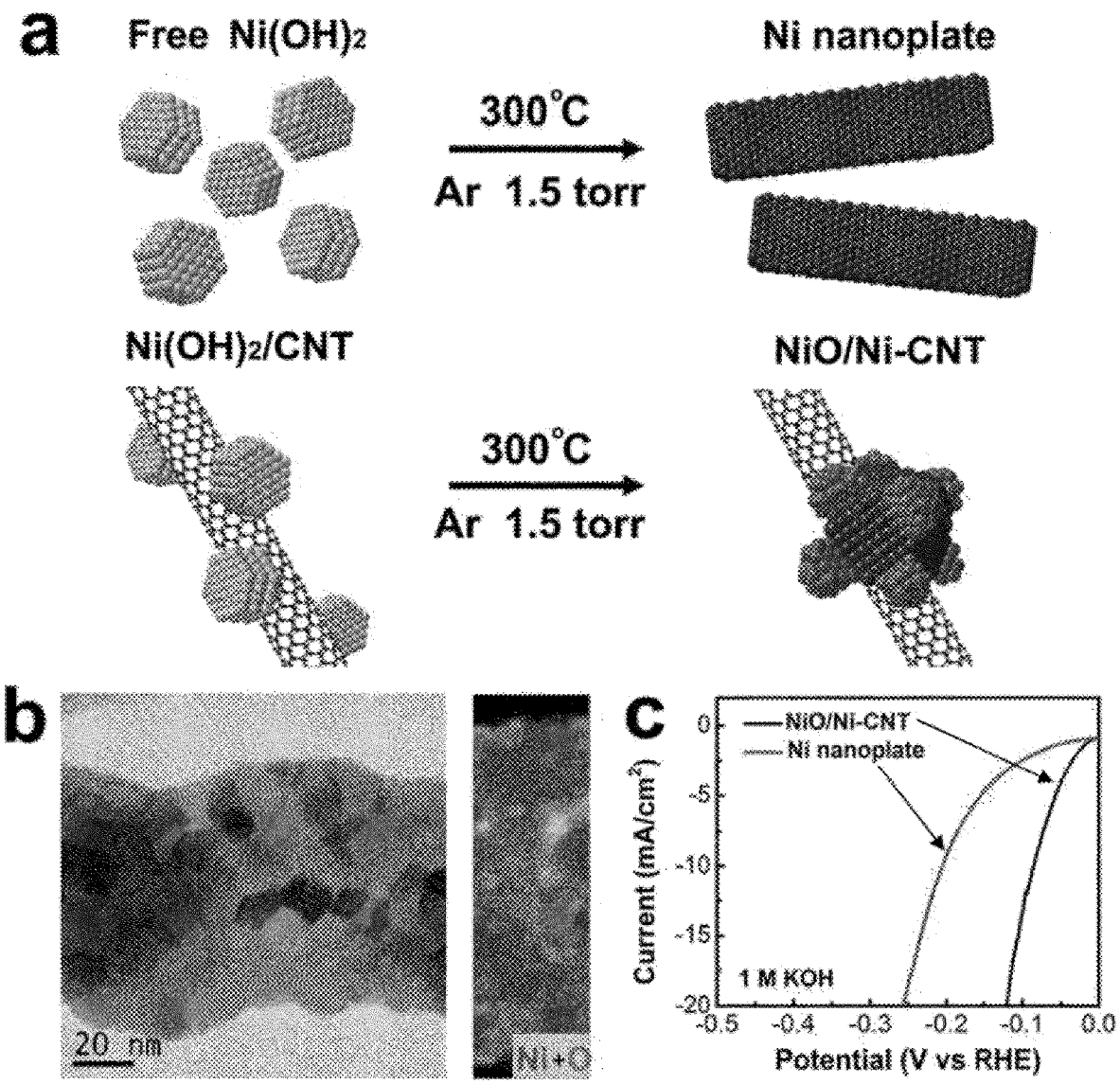

FIG. 3. Different products made by the same reaction with and without oxidized CNT as growth substrate. (a) A schematic illustration of the structural difference between CNT hybrid and pure nanoparticle. (b) STEM bright field image showing the typical morphology of the CNT-free Ni nanoplate and the corresponding reconstructed maps from the highlighted area with Ni and O. A very small amount of NiO particles is observed on the surface. (c) Linear sweep voltammetry of NiO/Ni-CNT hybrid and CNT-free Ni nanoplate in about 1 M KOH at a scan rate of about 1 mV/s under a loading of about 0.28 mg/$cm^2$ on a RDE.

Figure 4:
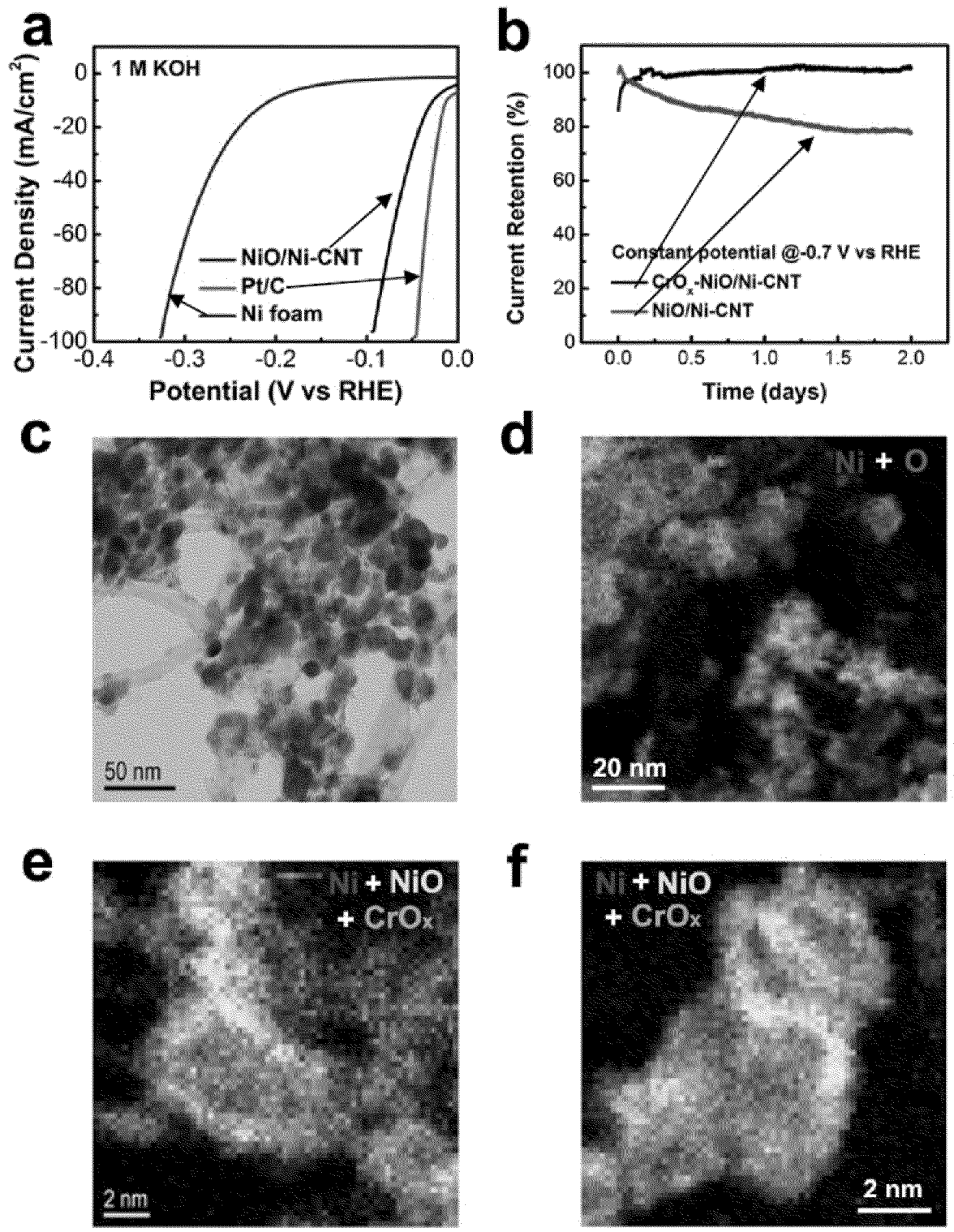

FIG. 4. High performance NiO/Ni-CNT cathode for HER catalysis. (a) Linear sweep voltammetry of NiO/Ni-CNT, Pt/C deposited on Ni foam and pure Ni foam at a scan rate of about 1 mV/s under a loading of about 8 mg/$cm^2$ in about 1 M KOH. (b) Chonoamperometry of NiO/Ni-CNT and $CrO_x$—NiO/Ni-CNT at a constant current potential of about −0.7 V vs RHE in about 1 M KOH. (c, d) STEM bright field image of NiO/Ni-CNT after 2 day operation under HER condition and the corresponding reconstructed maps from the highlighted area with Ni and O. (e) reconstructed maps of as-made $CrO_x$—NiO/Ni-CNT with Ni, NiO, and $CrO_x$. (f) reconstructed maps of $CrO_x$—NiO/Ni-CNT after 2 days operation under HER condition with Ni, NiO, and $CrO_x$.

Figure 5:
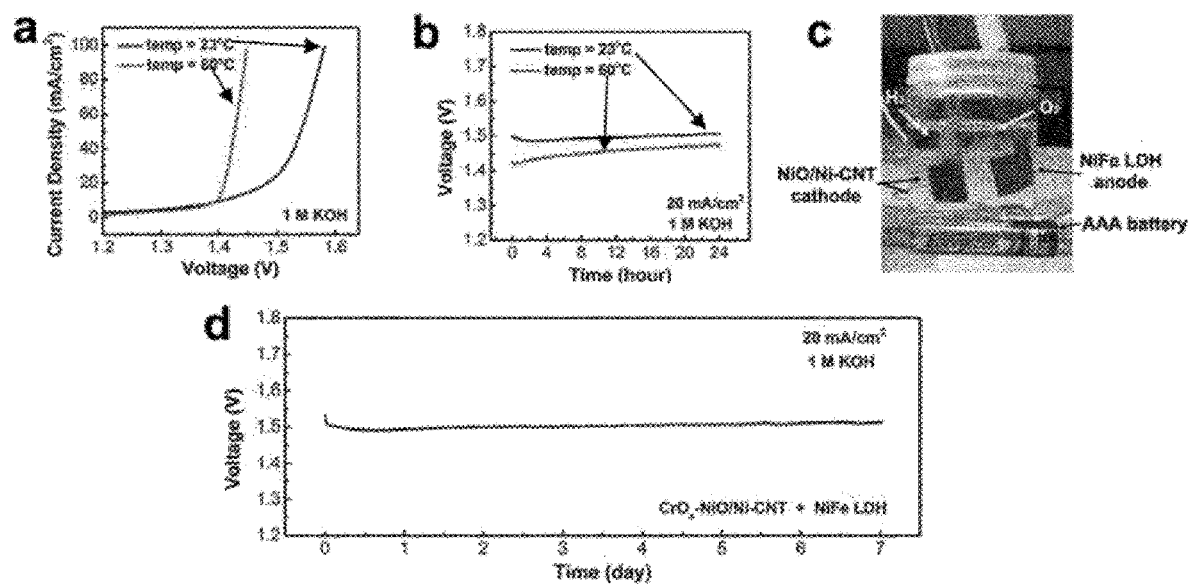

FIG. 5. Water electrolysis with less than about 1.5 V onset using NiO/Ni-based catalyst. (a) Linear sweep voltammetry of water electrolysis using NiO/Ni-CNT as HER catalyst and NiFe layered double hydroxide (LDH) as oxygen evolution reaction (OER) catalyst (both loaded into Ni foam at a loading of about 8 mg/$cm^2$) in about 1 M KOH under different temperatures. An onset of less than about 1.5 V and about 1.4 V could be obtained under about 23° C. and about 60° C. respectively. (b) Chonopotentiometry of water electrolysis using NiO/Ni-CNT and NiFe LDH at a constant current density of about 20 mA/$cm^2$ in about 1 M KOH. (c) Demonstration of water splitting device powered by an AAA battery with a nominal voltage of about 1.5 V. (d) Long-term chonopotentiometry of water electrolysis using $CrO_x$—NiO/Ni-CNT and NiFe LDH at a constant current density of about 20 mA/$cm^2$ in about 1 M KOH at room temperature.

Figure 6:
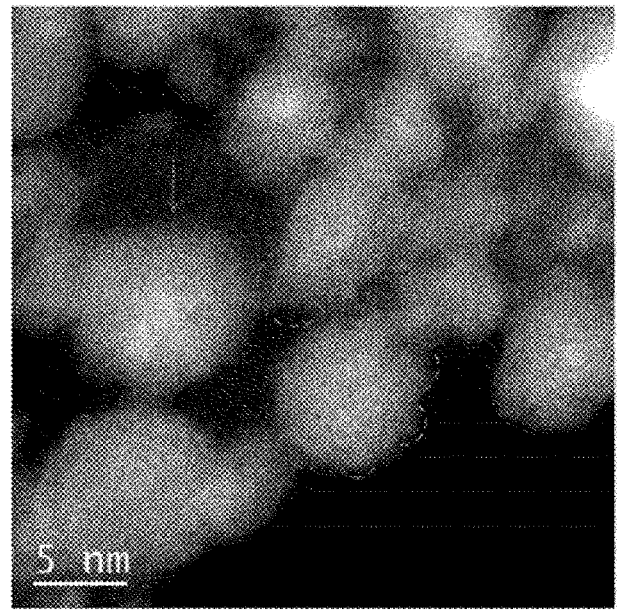

FIG. 6. STEM dark field (DF) image of NiO/Ni-CNT showing non-uniform coating of NiO nanoparticles on Ni cores (the circles show individual NiO nanoparticles with different orientations, and the arrow points out a NiO/Ni heterostructure with morphology of Ni core non-uniformly coated with small NiO nanoparticles.

Figure 7:
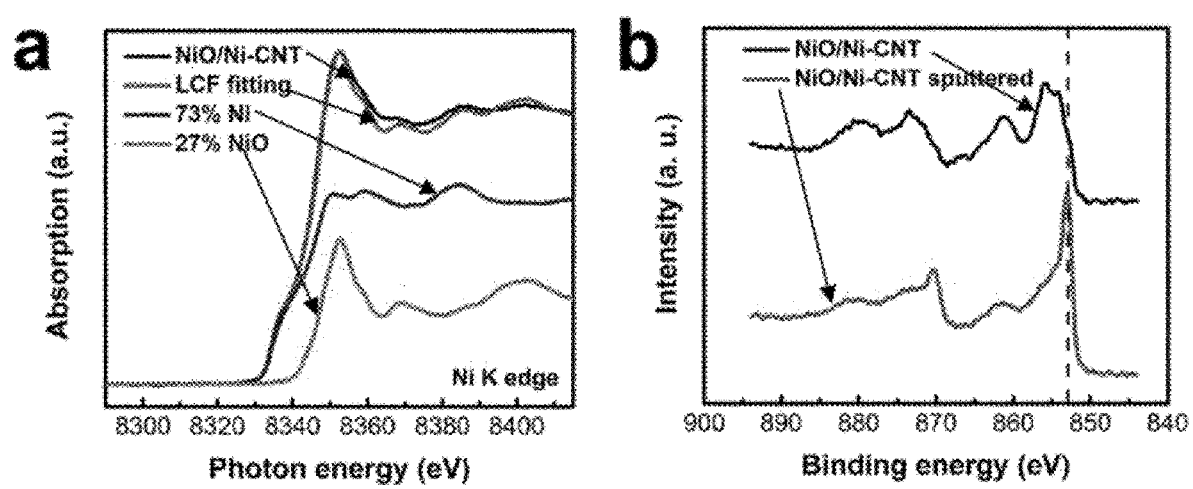

FIG. 7. (a) Ni K edge XANES spectrum of NiO/Ni-CNT, pattern of Ni and NiO, and linear fitting spectrum. (b) XPS survey spectrum of NiO/Ni-CNT and sputtered NiO/Ni-CNT by Ar ion gun.

Figure 8:
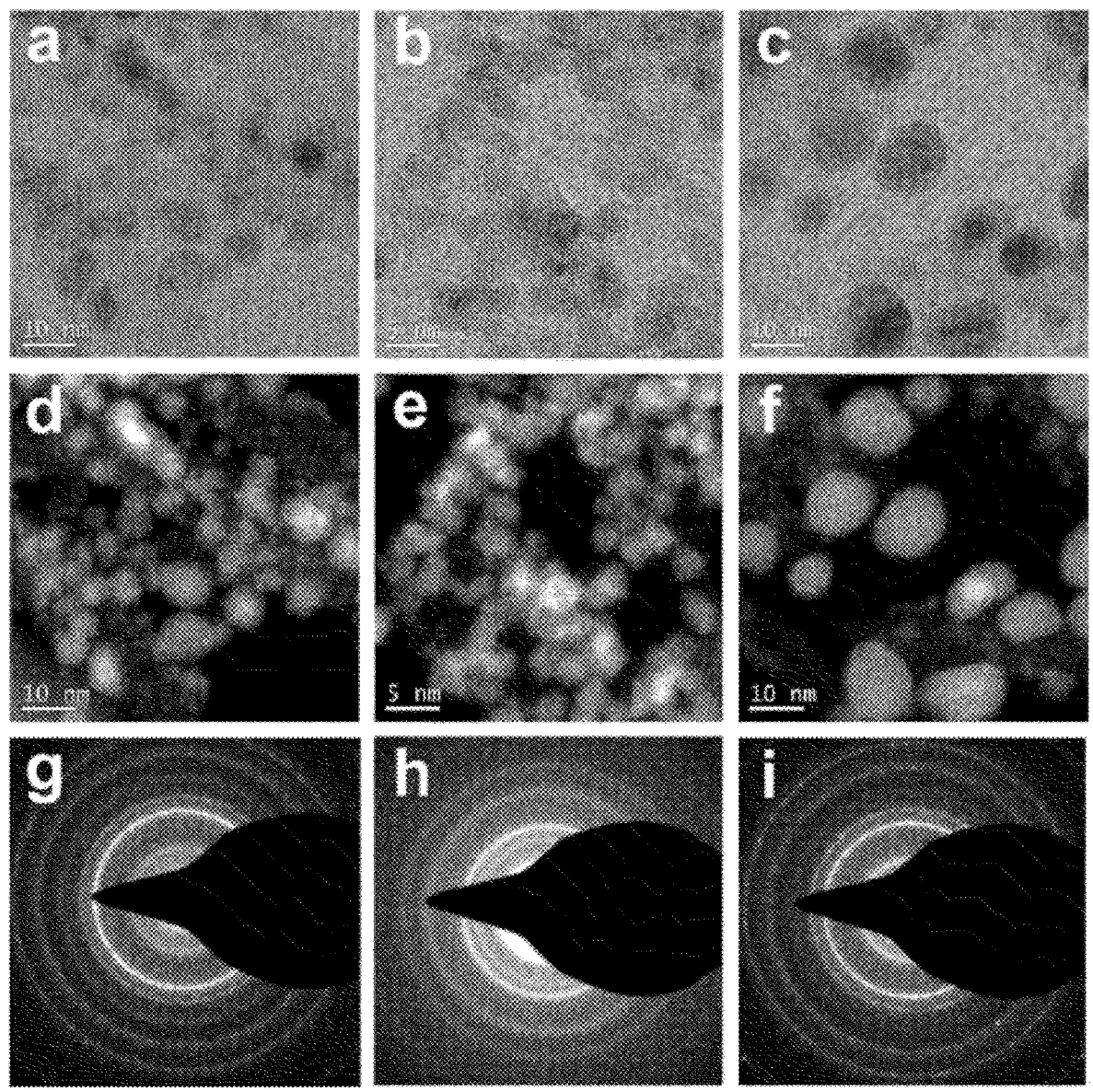

FIG. 8. (a-c) STEM bright field (BF) image of (a) NiO/Ni-CNT (b) NiO/CNT and (c) Ni/CNT, (d-f) STEM DF image of (d) NiO/Ni-CNT (e) NiO/CNT and (f) Ni/CNT, (g-i) Electron diffraction (ED) pattern of (g) NiO/Ni-CNT (h) NiO/CNT and (i) Ni/CNT.

Figure 9:
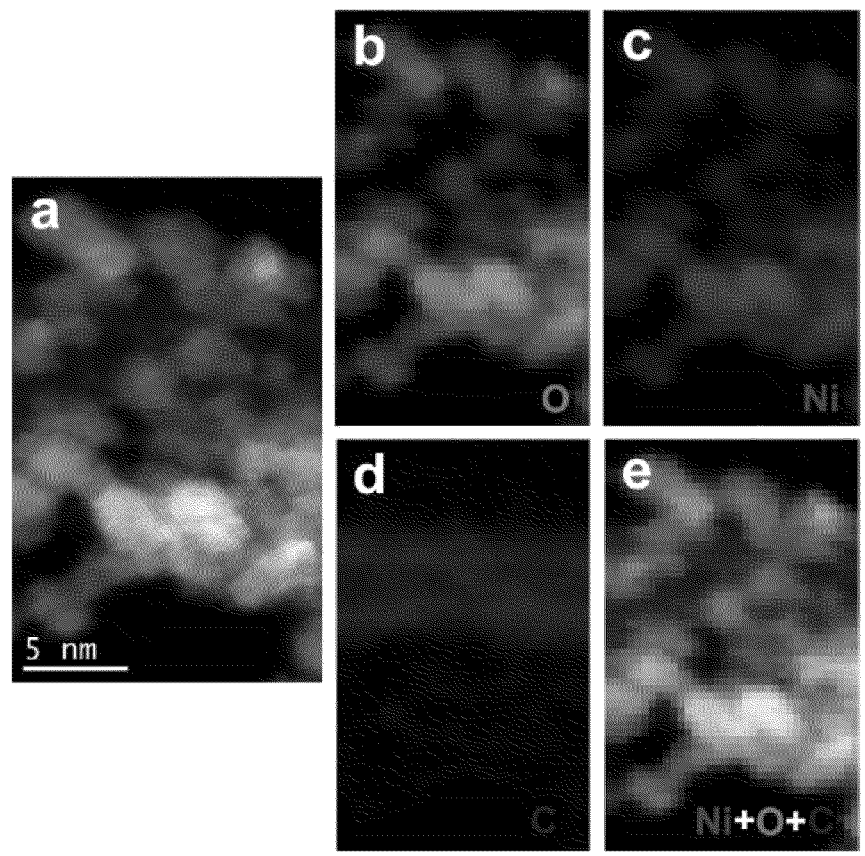

FIG. 9. (a) STEM DF image of NiO/CNT hybrid. (b-d) Chemical maps for the spatial distribution of O, Ni and C, from the whole area shown in (a). (e) Reconstructed chemical map from the whole area shown in (b), with Ni, O, and C.

Figure 10:
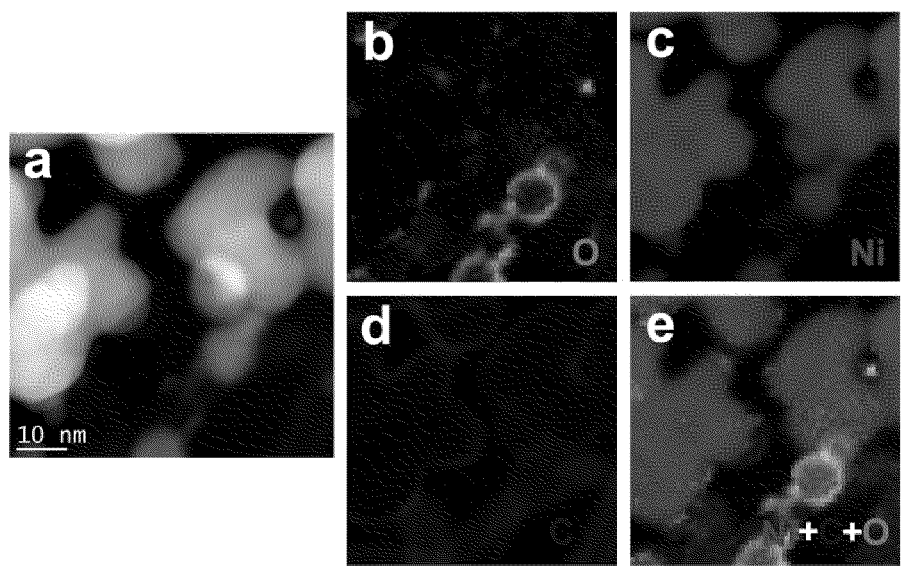

FIG. 10. (a) STEM DF image of Ni/CNT hybrid. (b-d) Chemical maps for the spatial distribution of O, Ni and C, from the whole area shown in (a). (e) Reconstructed chemical map from the whole area shown in (b), with Ni, O, and C in blue.

Figure 11:
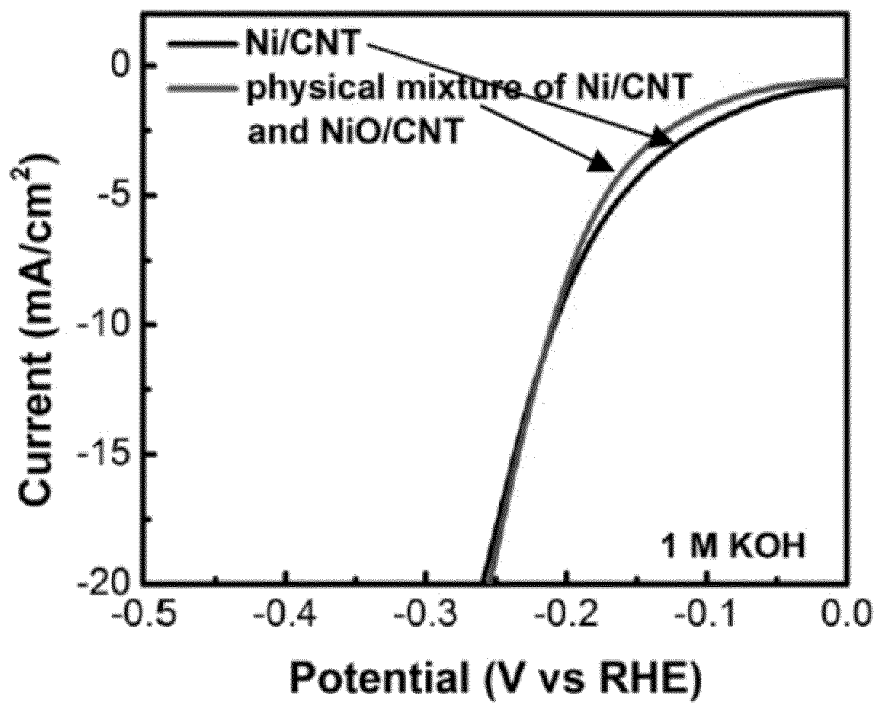

FIG. 11. Linear sweep voltammetry of Ni/CNT hybrid and physical mixture of Ni/CNT and NiO/CNT in about 1 M KOH at a scan rate of about 1 mV/s under a loading of about 0.28 mg/$cm^2$ on a RDE.

Figure 12:
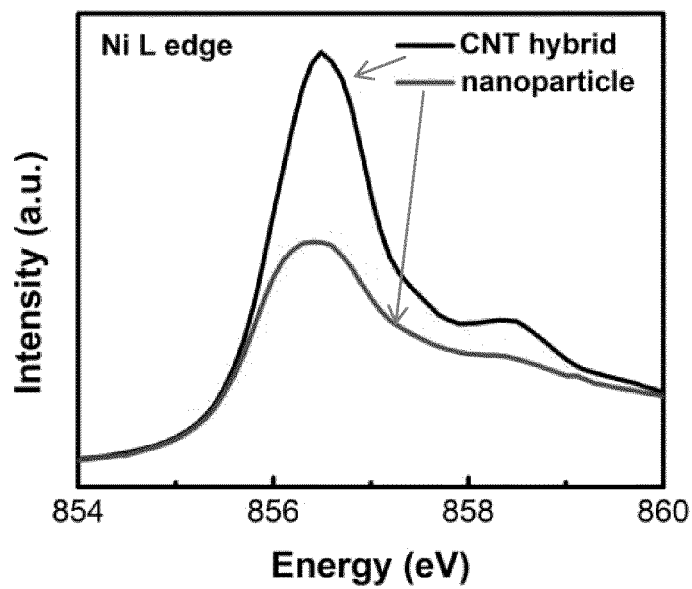

FIG. 12. Ni L edge XANES spectra of CNT hybrid and CNT-free nanoparticle.

Figure 13:
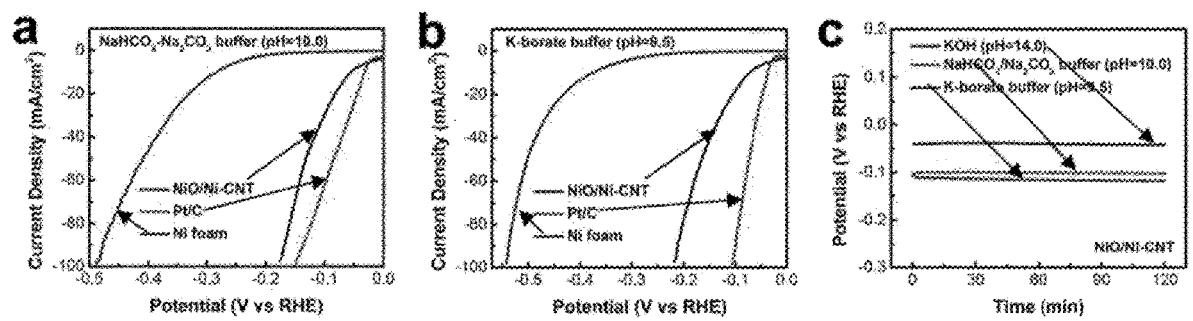

FIG. 13 (a-b) Linear sweep voltammetry of NiO/Ni-CNT, Pt/C deposited on Ni foam and pure Ni foam at a scan rate of about 1 mV/s under a loading of about 8 mg/$cm^2$ in (a) $NaHCO_3$—$Na_2CO_3$ buffer (pH=about 10.0) and (b) K-borate buffer (pH=about 9.5). (c) Chronopotentiometry of NiO/Ni-CNT in three electrolytes under a constant current density of about 20 mA/$cm^2$.

Figure 14:
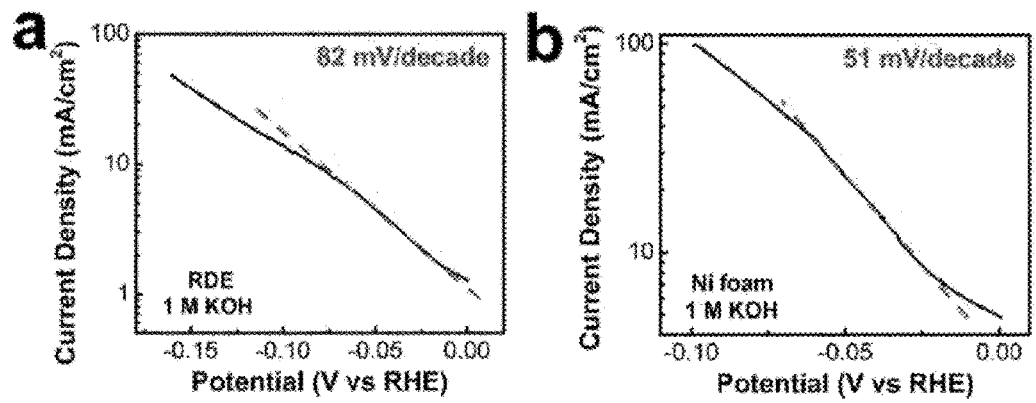

FIG. 14. Tafel plots of the HER catalytic activity of NiO/Ni-CNT loaded (a) on a RDE at a loading of about 0.28 mg $cm^{-2}$ and (b) on a Ni foam at a loading of about 8 mg $cm^{-2}$.

Figure 15:
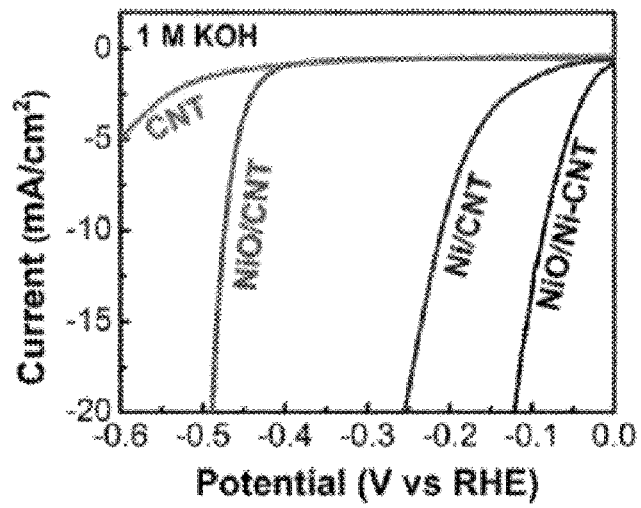

FIG. 15. Linear sweep voltammetry of CNT alone compared to other three hybrid materials in about 1 M KOH at a scan rate of about 1 mV $s^{-1}$ under a loading of about 0.28 mg $cm^{-2}$ on a RDE.

Figure 16:
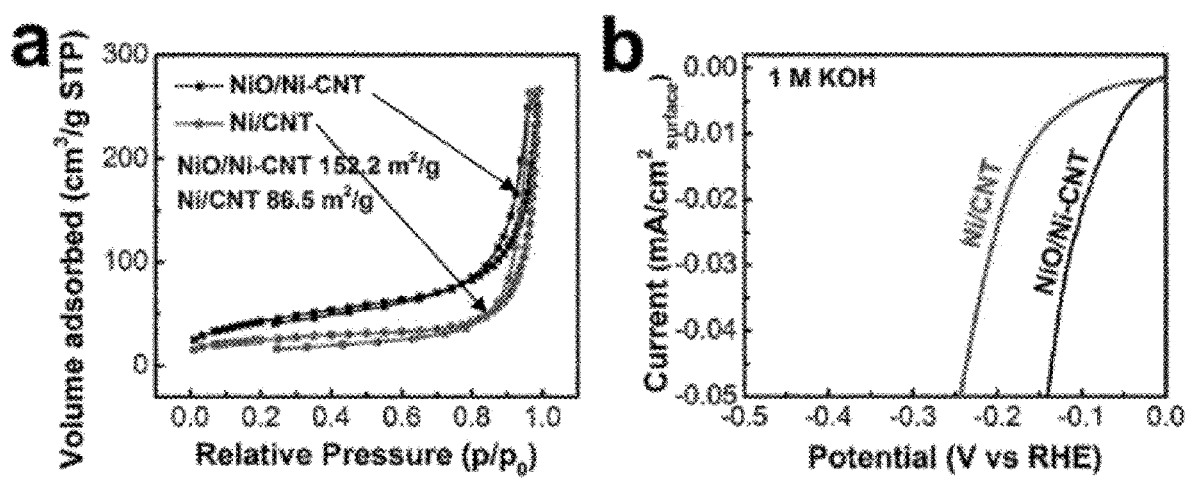

FIG. 16. (a) Brunauer-Emmett-Teller (BET) surface area analysis of NiO/Ni-CNT and Ni/CNT. (b) Linear sweep voltammetry of NiO/Ni-CNT and Ni/CNT in about 1 M KOH under the loading of about 0.28 mg $cm^{-2}$ on a RDE with normalization to surface area.

Figure 17:
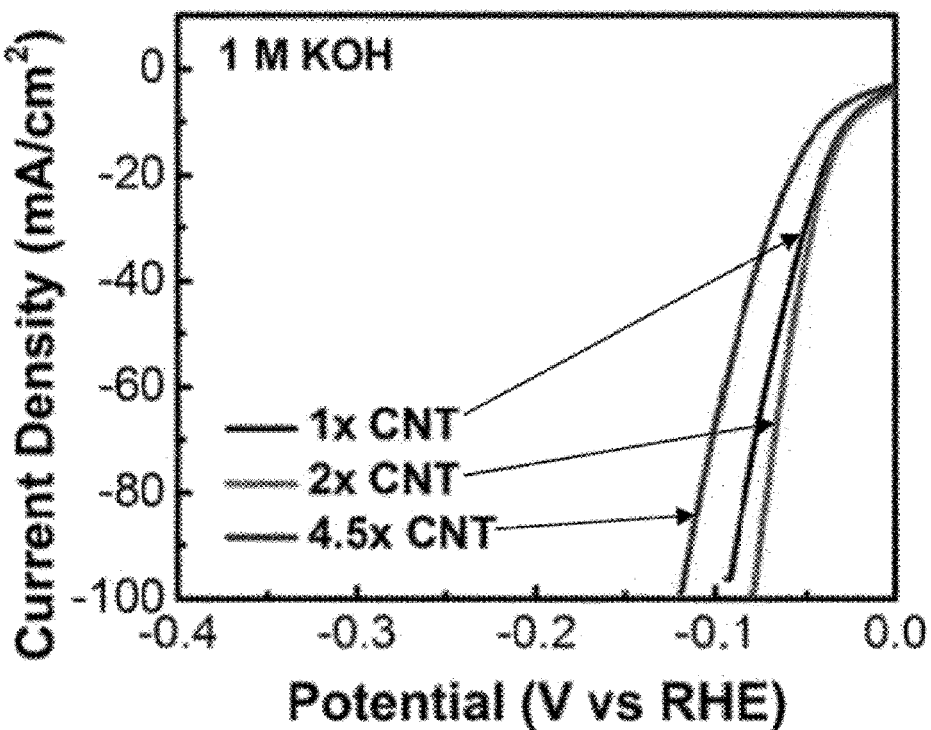

FIG. 17. Linear sweep voltammetry of NiO/Ni-CNT with differently oxidized CNT precursors (1×CNT, 2×CNT, and 4.5×CNT, × refers to the mass ratio of $KMnO_4$ to C used in the modified Hummer's method) deposited on Ni foam at a scan rate of about 1 mV $s^{-1}$ under a loading of about 8 mg $cm^{-2}$ in about 1 M KOH.

Figure 18:
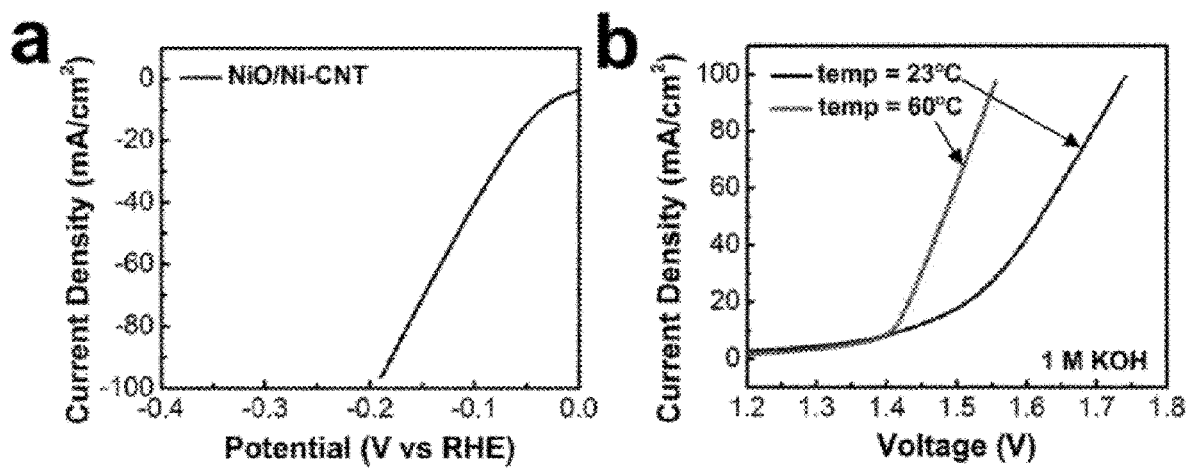

FIG. 18. (a) Uncompensated linear sweep voltammetry of NiO/Ni-CNT deposited on Ni foam at a scan rate of about 1 mV $s^{-1}$ under a loading of about 8 mg $cm^{-2}$ in about 1 M KOH (resistance=about 1.0 ohm). (b) Uncompensated linear sweep voltammetry of water electrolysis using NiO/Ni-CNT as HER catalyst and NiFe LDH as OER catalyst (both loaded into Ni foam at a loading of about 8 mg $cm^{-2}$) in about 1 M KOH under different temperature (resistance=about 1.6 ohm at about 23° C. and about 1.1 ohm at about 60° C.).

Figure 19:
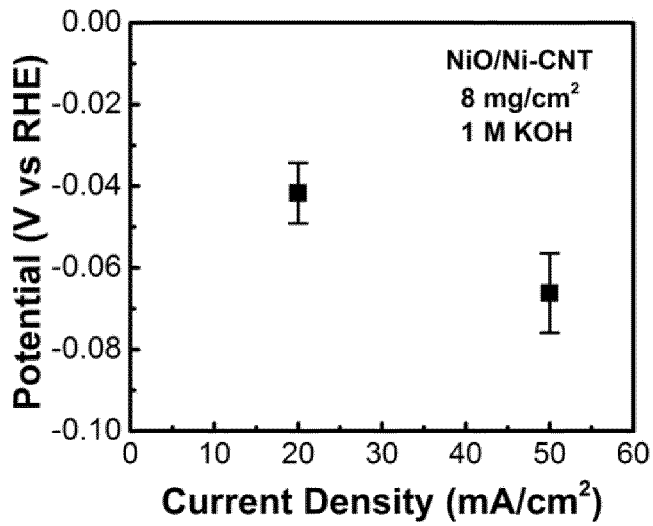

FIG. 19. Mean value and standard deviation of 6 linear sweep voltammetry curves of NiO/Ni-CNT loaded on Ni foam at a loading of about 8 mg $cm^{-2}$ in about 1 M KOH.

Figure 20:
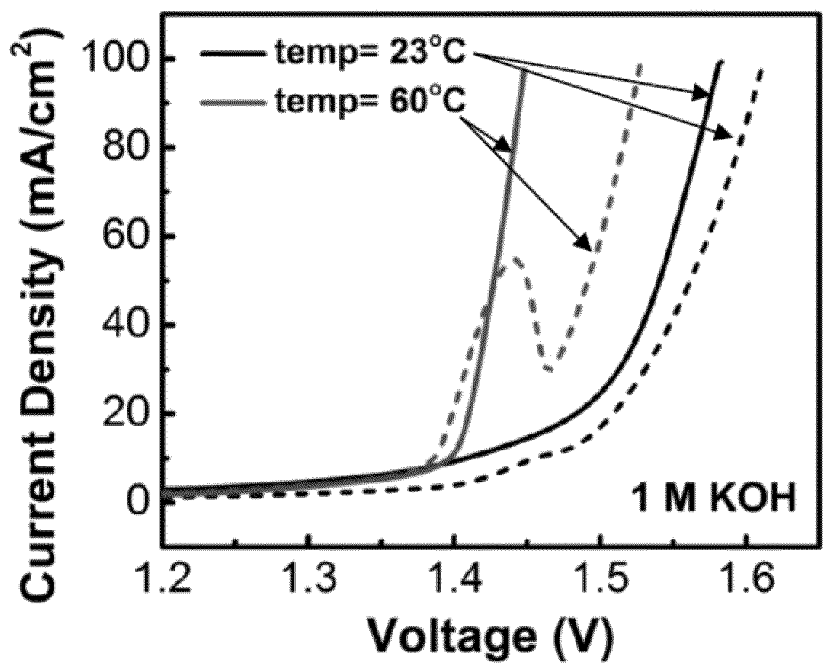

FIG. 20. Linear sweep voltammetry of water electrolysis using NiO/Ni-CNT as HER catalyst and NiFe LDH as OER catalyst (both loaded into Ni foam at a loading of about 8 mg cm$^{-2}$) before (solid line) and after 24 h stability test (dashed line) in about 1 M KOH under different temperatures.

Figure 21:
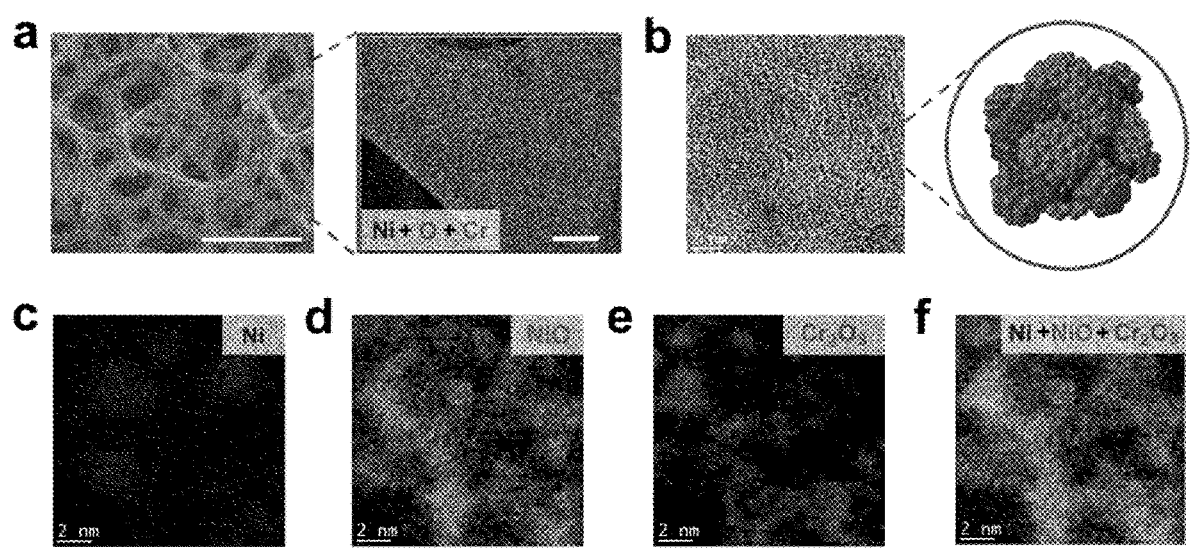

FIG. 21. (a) Low magnification scanning electron microscopy (SEM) image of a Ni@Cr$_2$O$_3$—NiO (CrNN) catalyst electrode with selected area Auger electron spectroscopy (AES) elemental mapping showing uniform distribution of Ni, O and Cr. (b) high resolution STEM bright field image of the CrNN catalyst with its schematic illustration. (c-f) high magnification chemical maps via STEM-electron energy-loss spectroscopy (EELS) imaging for the spatial distribution of Ni, NiO, Cr$_2$O$_3$ and their overlays showing Cr$_2$O$_3$ blended NiO/Ni hetero structures.

Figure 22:
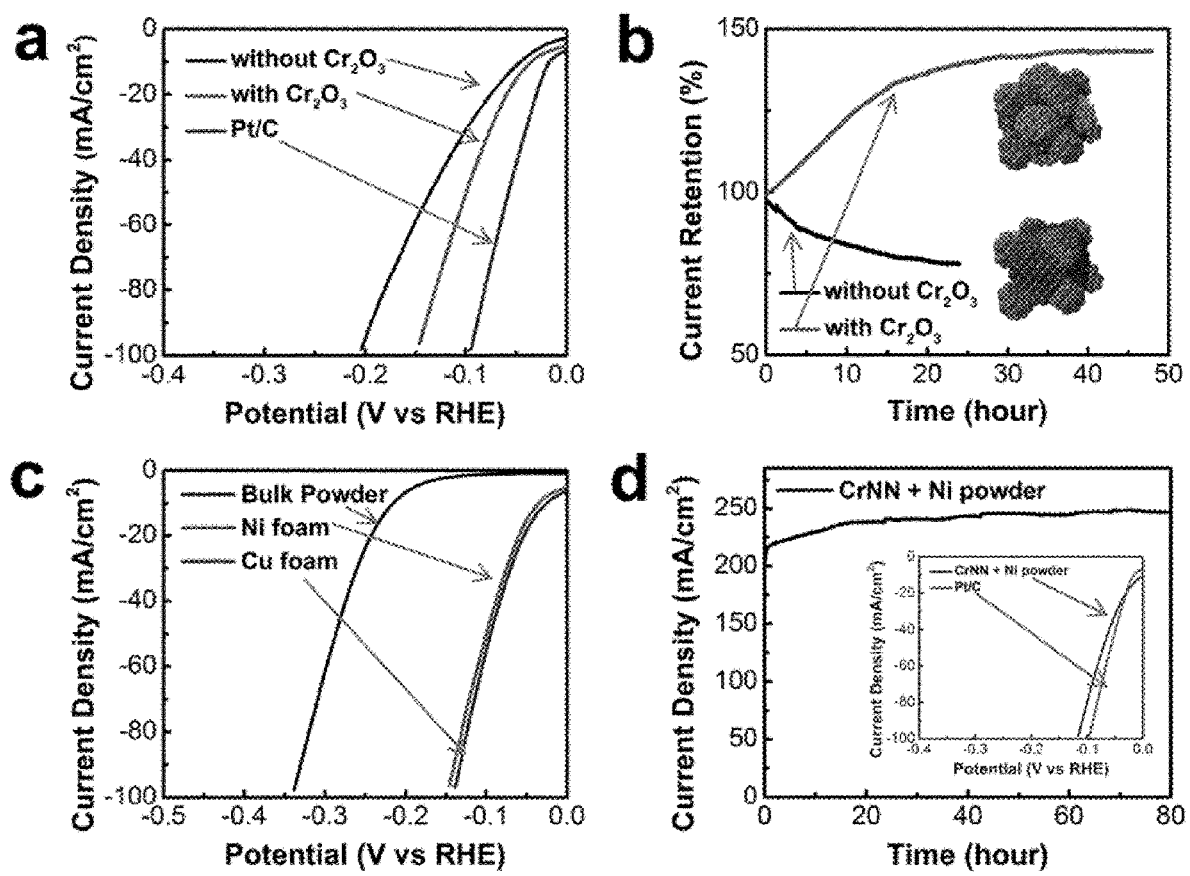

FIG. 22. (a) Linear sweep voltammetry curves of NiO/Ni heterostructure with and without Cr$_2$O$_3$ blending and Pt/C in about 1 M KOH at a scan rate of about 1 mV/s under a loading of about 8 mg/cm$^2$ without iR compensation (R=about 0.5 ohm). The CrNN catalyst (with Cr$_2$O$_3$) was pre-activated at about 20 mA/cm$^2$ for about 2 hours. (b) Chronoamperometry curves of NiO/Ni heterostructure with and without Cr$_2$O$_3$ blending under a loading of about 8 mg/cm$^2$ with initial current densities of about 20 mA/cm$^2$. (c) Linear sweep voltammetry curves of CrNN catalyst in bulk powder form, in Ni foam and in Cu foam in about 1 M KOH under a loading of about 8 mg/cm$^2$ without iR compensation (R=about 0.5 ohm). (d) Chronoamperometry curves of the CrNN catalyst under a loading of about 24 mg/cm$^2$ with about 30 wt % Ni powder at constant potential of about −0.25 V vs RHE without iR compensation (R=about 0.6 ohm). Inset shows linear sweep voltammetry curves of CrNN catalyst under a loading of about 24 mg/cm$^2$ with about 30 wt % Ni powder compared to about 8 mg/cm$^2$ Pt/C without iR compensation (R=about 0.6 ohm). The sample was pre-activated at about 20 mA/cm$^2$ for about 2 hours.

Figure 23:
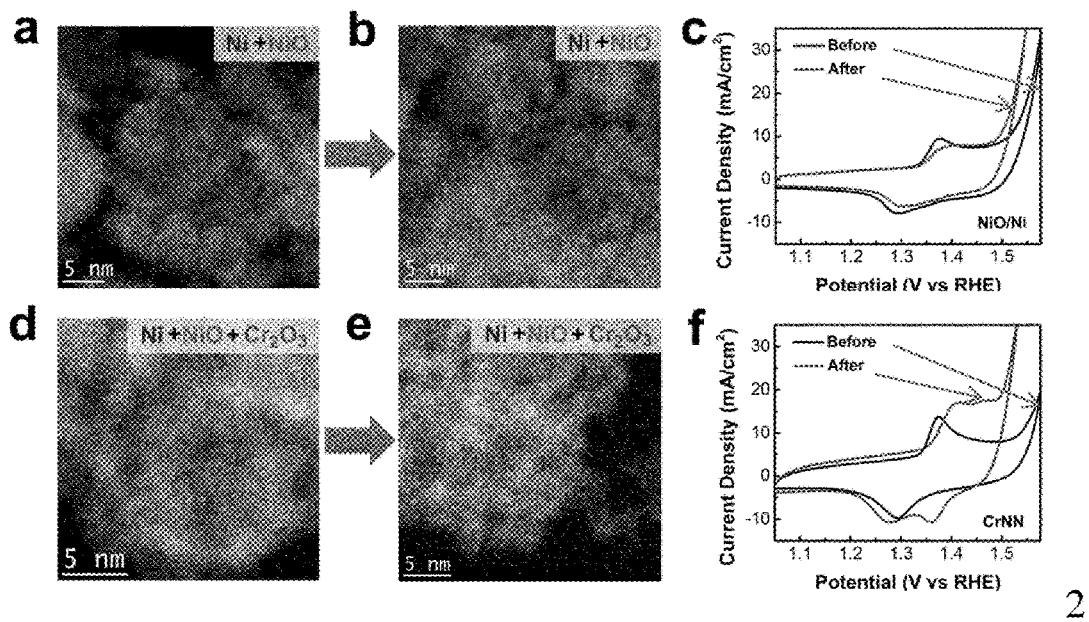

FIG. 23. (a-b) High magnification STEM-EELS chemical maps for the spatial distribution of Ni, NiO and their overlays in the NiO/Ni heterostructure (a) before and (b) after the stability test showing oxidation of metallic Ni component. (c) cyclic voltammetry curves of NiO/Ni heterostructure before and after stability test at a scan rate of about 10 mV/s in about 1 M KOH. (d-e) high magnification STEM-EELS chemical maps for the spatial distribution of Ni, NiO, Cr$_2$O$_3$ and their overlays in the CrNN catalyst (d) before and (e) after the stability test showing intact structure. (f) cyclic voltammetry curves of the CrNN catalyst before and after stability test at a scan rate of about 10 mV/s in about 1 M KOH, showing the formation of an oxidation-resistant Ni-species.

Figure 24:
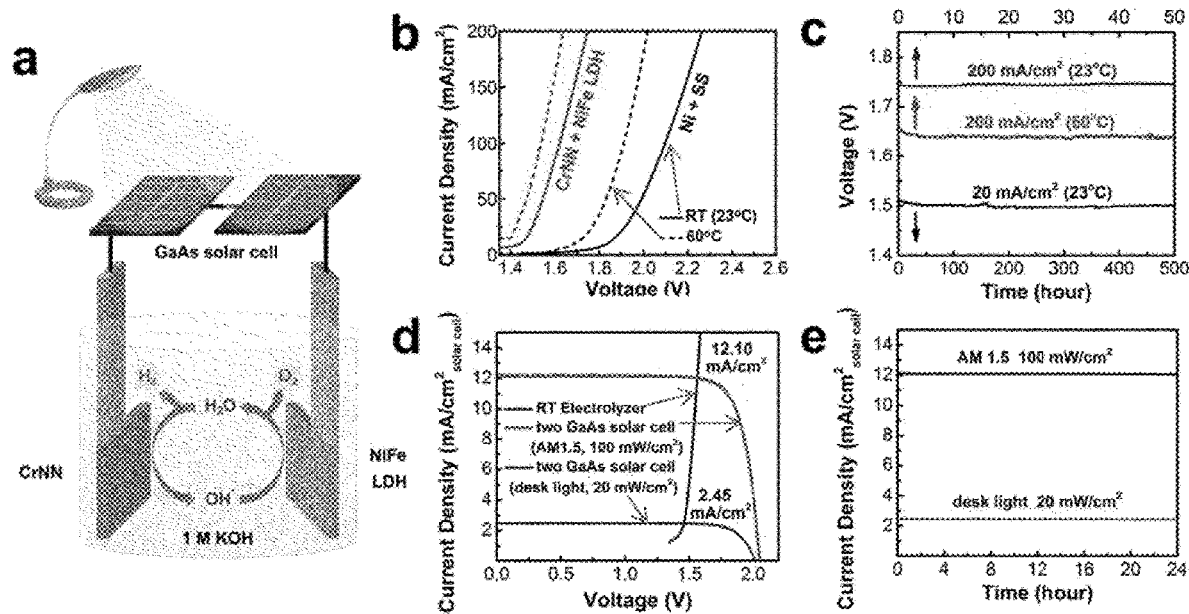

FIG. 24. (a) Schematic diagram of solar-driven water splitting using two GaAs solar cell in series and alkaline electrolyzer with CrNN and NiFe LDH catalysts. (b) Linear sweep voltammetry curves of alkaline electrolyzer using CrNN catalyst as cathode (about 24 mg/cm$^2$ with about 30 wt % Ni powder) and NiFe LDH as anode (about 24 mg/cm$^2$ with about 30 wt % Ni powder) compared to Ni cathode and stainless steel (SS) anode under room temperature (RT, about 23° C.) and about 60° C. at a scan rate of about 1 mV/s without iR compensation. (R=about 0.9 ohm in both electrolyzers) (c) Chronopotentiometry curves of alkaline electrolyzer with CrNN and NiFe LDH catalysts at constant current density of about 20 mA/cm$^2$ at RT for about 500 h, about 200 mA/cm$^2$ at RT for about 50 h, about 200 mA/cm$^2$ at about 60° C. for about 50 h without iR compensation (R=about 0.9 ohm). (d) Solar cell i-V curves of GaAs solar cell under simulated AM 1.5 100 mW/cm$^2$ and LED desk light 20 mW/cm$^2$ illumination overlapping with electrolyzer i-V curves. The illuminated surface areas of the GaAs solar cell are about 5.36 cm$^2$ under AM 1.5 100 mW/cm$^2$ and about 17.0 cm$^2$ under LED desk light 20 mW/cm$^2$, and the catalyst electrode areas (geometric) were about 5 cm$^2$ each. (e) current density vs time curve of the GaAs solar cell driven water splitting under simulated AM 1.5 100 mW/cm$^2$ and LED desk light 20 mW/cm$^2$ illumination.

Figure 25:
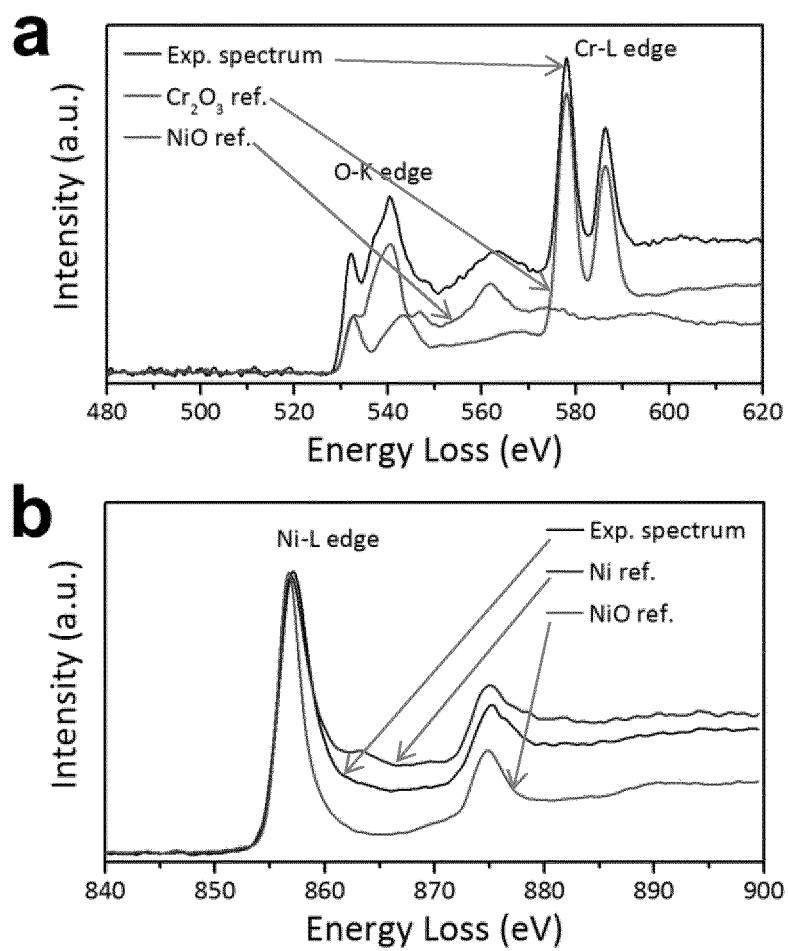

FIG. 25. (a) EELS spectra of CrNN catalyst with a standard Cr$_2$O$_3$ and NiO reference in the region of O-K edge and Cr-L edge. (b) EELS spectra of CrNN catalyst with a standard Ni and NiO reference in the region of Ni-L edge.

Figure 26:
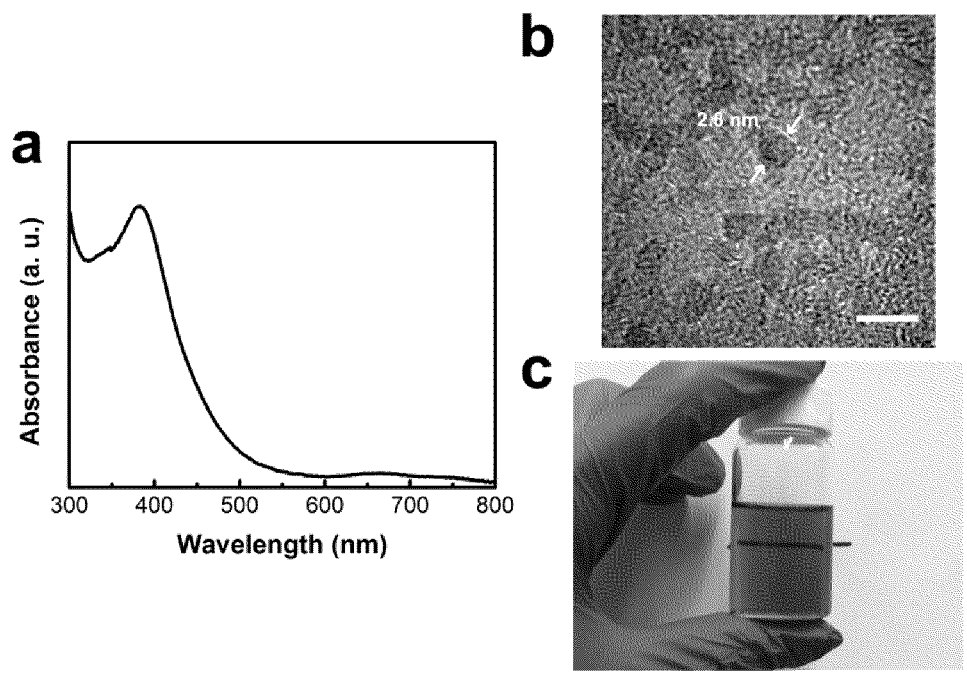

FIG. 26. (a) UV-vis absorbance spectrum of the NiCr LDH precursor ethanol suspension. (b) High resolution TEM (HRTEM) image of the NiCr LDH precursor. Scale bar, 5 nm (c) Clear suspension of NiCr LDH showing high transparency.

Figure 27:
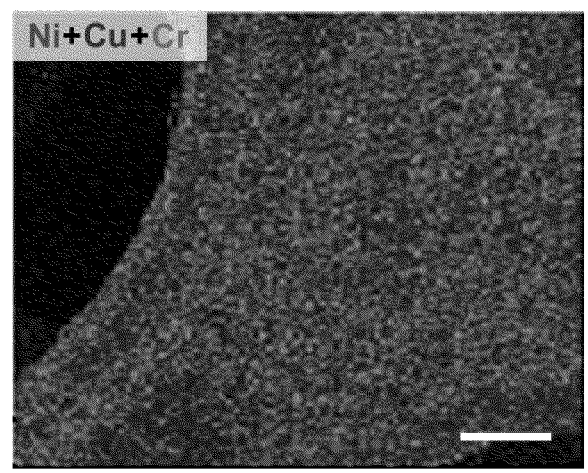

FIG. 27. AES mapping of CrNN catalyst on Cu foam.

Figure 28:
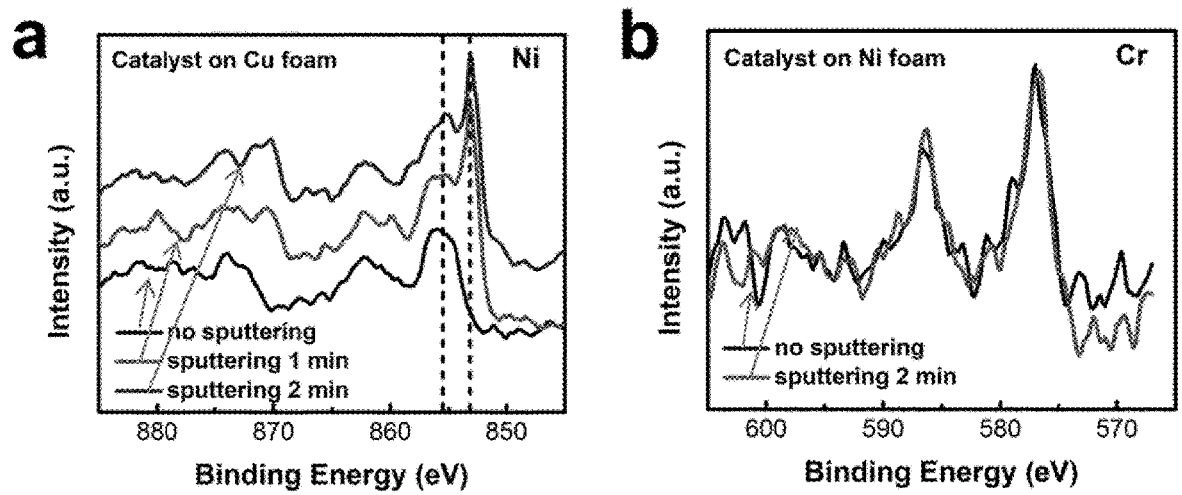

FIG. 28. (a) High Resolution Ni XPS spectrum of the CrNN catalyst on Cu foam. The peak with binding energy of about 855.6 eV and about 853.1 eV corresponds to Ni$^{2+}$ and Ni$^0$. (b) High Resolution Cr XPS spectrum of CrNN catalyst on Ni foam. The binding energy confirms the oxidation state of +3 for Cr in the catalyst.

Figure 29:
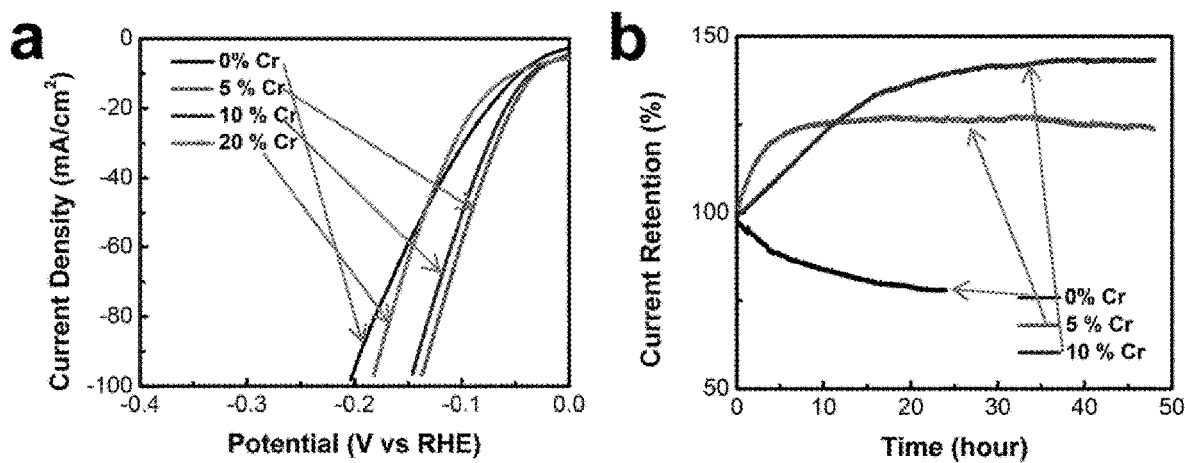

FIG. 29. (a) Linear sweep voltammetry curves of CrNN with different Cr content in about 1 M KOH at a scan rate of about 1 mV/s under a loading of about 8 mg/cm$^2$ without iR compensation. (b) Current retention vs time curves of CrNN with different Cr content at constant voltages with initial current densities of about 20 mA/cm$^2$.

Figure 30:
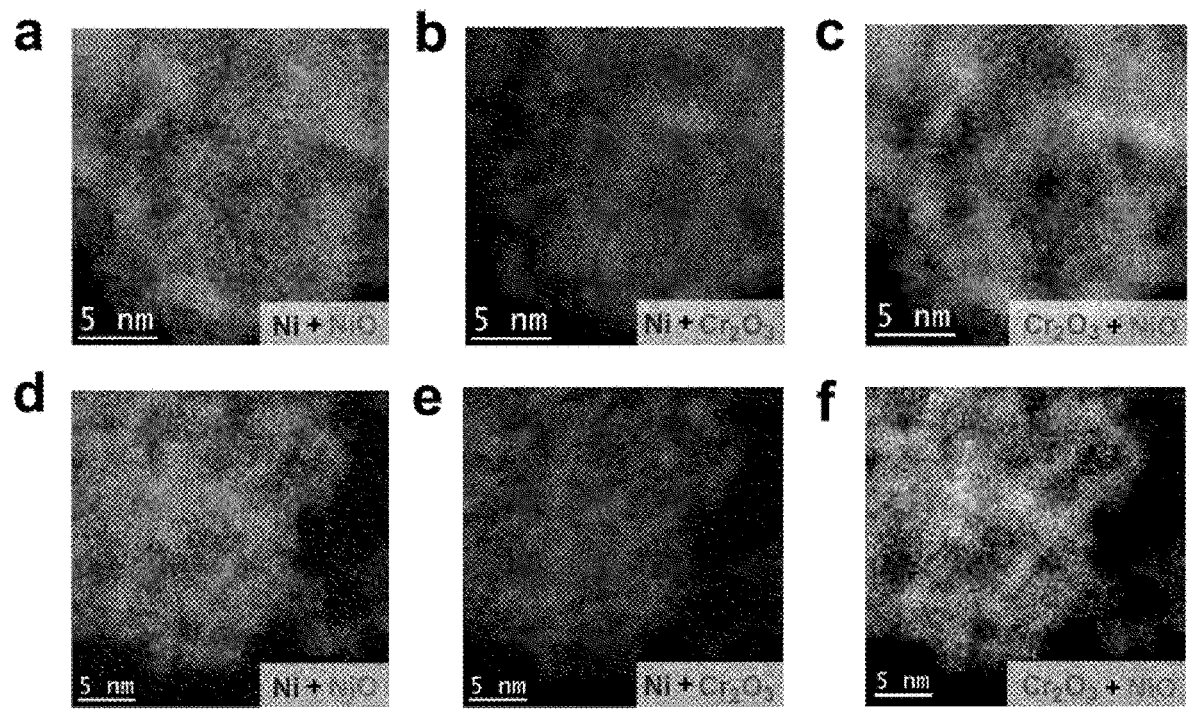

FIG. 30. (a-c) Chemical maps for the spatial distribution of Ni, NiO, Cr$_2$O$_3$ and their overlays in the as-made CrNN catalyst. (d-f) Chemical maps for the spatial distribution of Ni, NiO, Cr$_2$O$_3$ and their overlays in the CrNN catalyst after HER stability test. Comparison of the samples indicated co-localization of NiO and Cr$_2$O$_3$ during HER operation.

Figure 31:
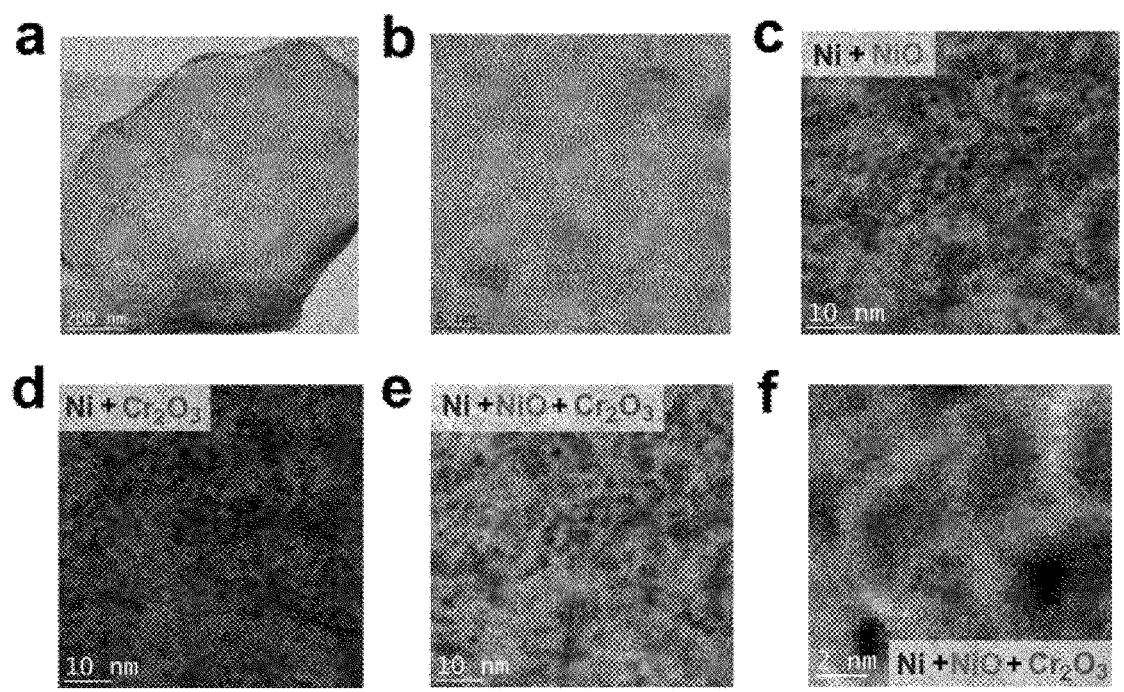

FIG. 31. (a) Low magnification, and b) high magnification, bright field STEM images of CrNN catalyst annealed in bulk powder state showing the structure of aggregated nanoparticles. (c-e) Chemical maps for the spatial distribution of Ni, NiO and Cr$_2$O$_3$ overlays. (f) High magnification chemical maps for the spatial distribution of Ni, NiO and Cr$_2$O$_3$ overlays showing complete oxide coating on the surface of metallic Ni cores.

Figure 32:
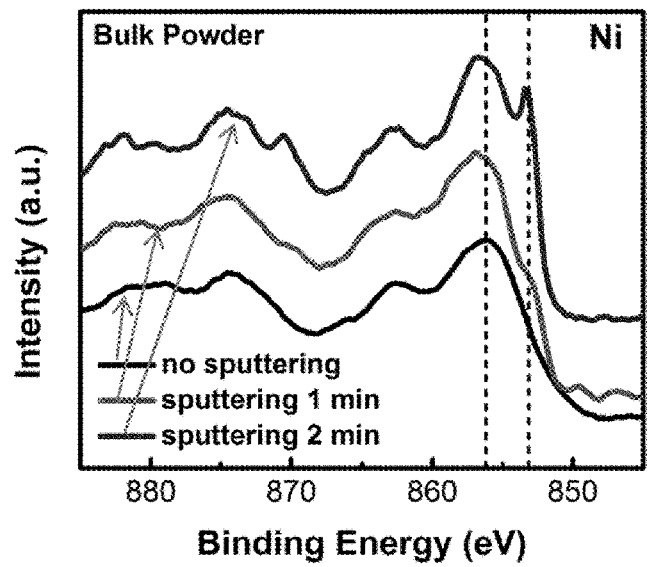

FIG. 32. High Resolution Ni XPS spectrum of the CrNN bulk powder. The peak with binding energy of about 856 eV and about 853.1 eV corresponds to Ni$^{2+}$ and Ni$^0$. The slower increase of metallic Ni peak intensity (than in FIG. 28a for catalyst grown on Ni foam) over sputtering indicates thick coating of the oxide layer on the surface.

Figure 33:
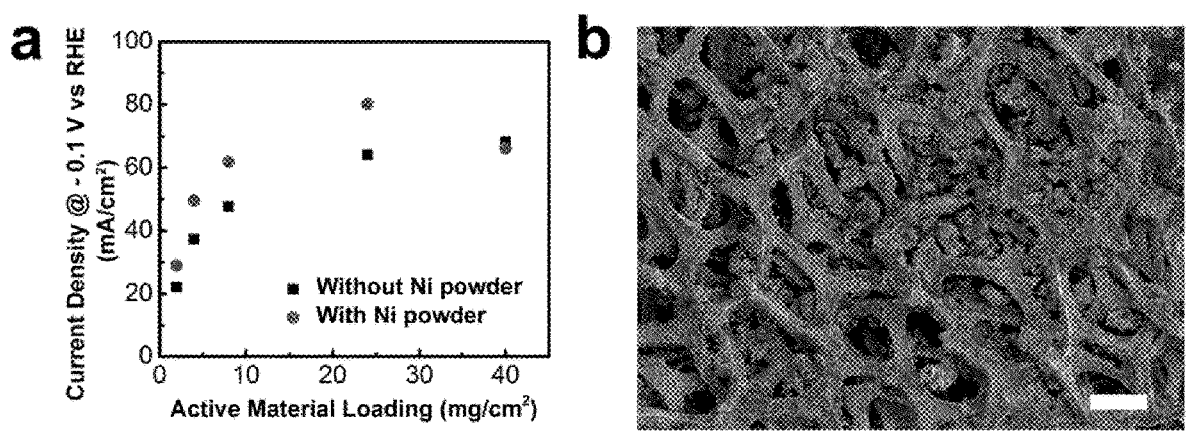

FIG. 33. (a) The current density at about −0.1 V vs RHE under different active material loading without iR compensation. The mass of the active material excludes the mass of Ni powder. (b) Low magnification SEM image of the electrode at about 40 mg/cm$^2$ active mass loading showing materials filling in voids within Ni foam. Scale bar, 200 μm. Saturation and even decreases in HER activity are observed at higher loadings of precursors into a Ni foam, accompanied by the observation of aggregated particles filling the voids inside the Ni foam substrate, which further corroborated the importance of catalyst formation on Ni wires in the foam, and that aggregated particles in the foam could block the active catalytic sites on the Ni wires.

Figure 34:
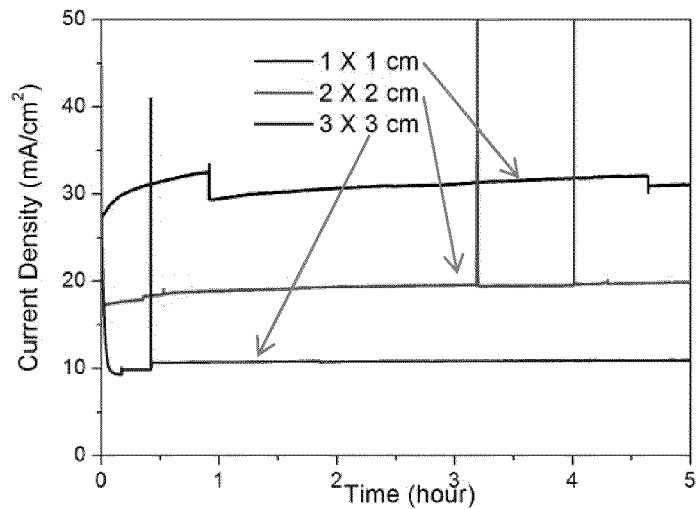

FIG. 34. Chronoamperometry curves of CrNN electrodes with sizes of 1×1 cm, 2×2 cm and 3×3 cm at constant potential of about −0.06 V vs RHE without iR compensation (R=about 0.5 ohm).

Figure 35:
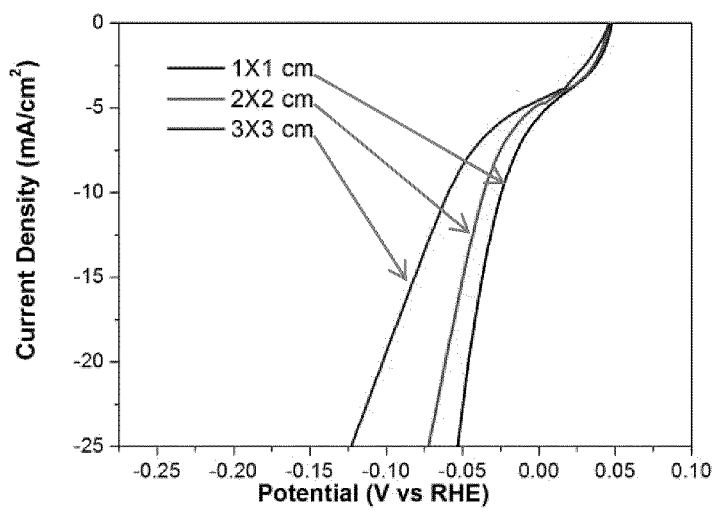

FIG. 35. Linear sweep voltammetry curves of CrNN electrodes with sizes of 1×1 cm, 2×2 cm and 3×3 cm without iR compensation (R=about 0.5 ohm) scanned at about 1 mV/s. The samples were pre-activated at chronoamperometry measurement for about 5 hours.

Figure 36:
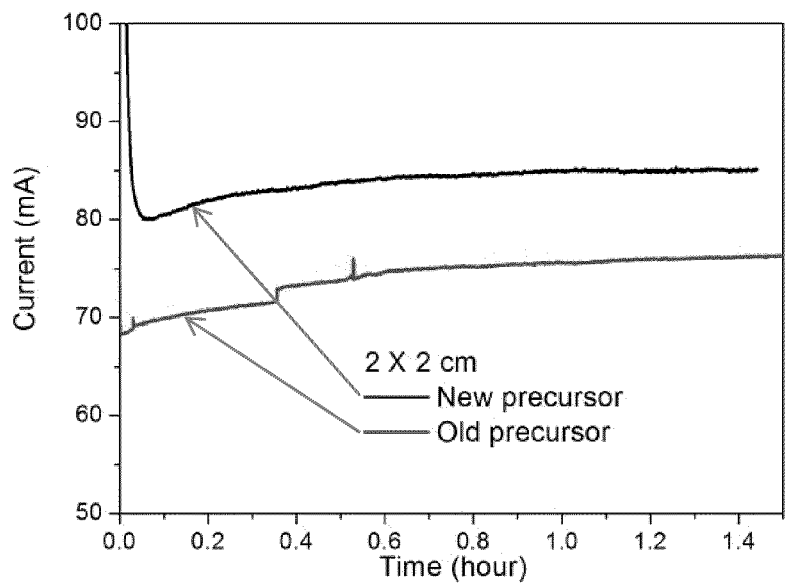

FIG. 36. Chronoamperometry curves of CrNN electrodes with a size of 2×2 cm fabricated by different precursor solutions at constant potential of about −0.06 V vs RHE without iR compensation (R=about 0.5 ohm).

Figure 37:
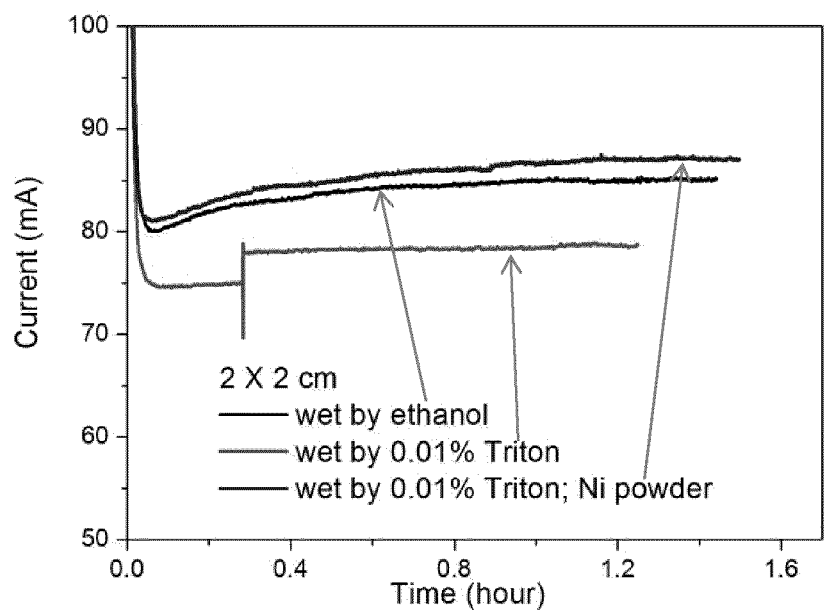

FIG. 37. Chronoamperometry curves of 2×2 cm CrNN electrodes at constant potential of about −0.06 V vs RHE without iR compensation (R=about 0.5 ohm).

Figure 38:
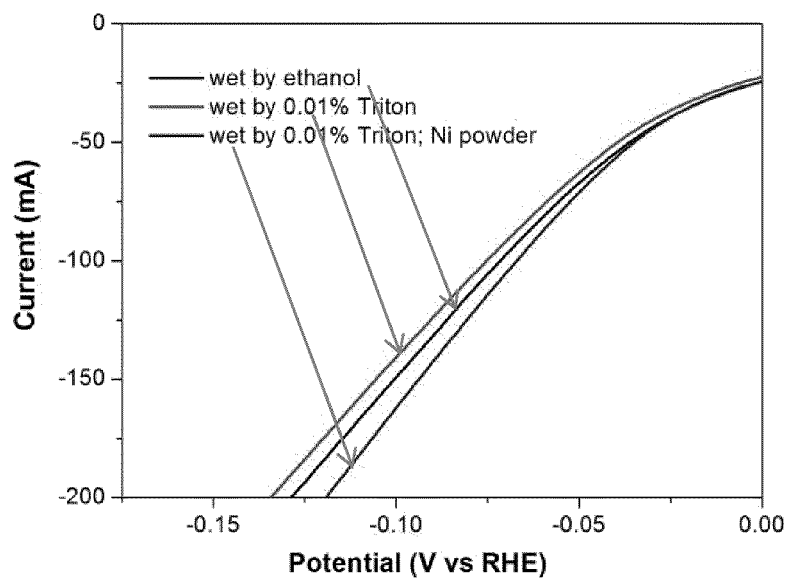

FIG. 38. Linear sweep voltammetry curves of 2×2 cm CrNN electrodes without iR compensation (R=about 0.5 ohm) scanned at about 1 mV/s. The samples were pre-activated at chronoamperometry measurement for over about 1 hour.

Figure 39:
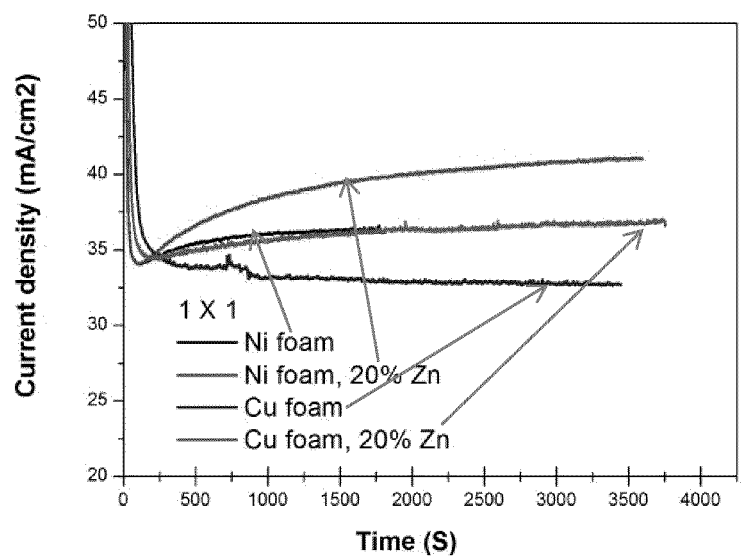

FIG. 39. Chronoamperometry curves of 1×1 cm Ni- and Cu-based electrodes with or without zinc doping at constant potential of about −0.06 V vs RHE without iR compensation (R=about 0.5 ohm).

Figure 40:
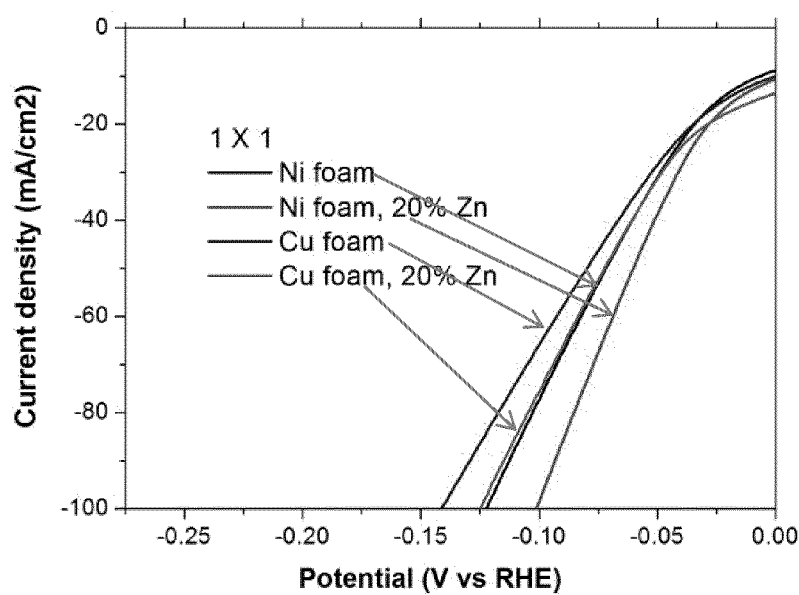

FIG. 40. Linear sweep voltammetry curves of 1×1 cm Ni- and Cu-based electrodes with or without zinc doping without iR compensation (R=about 0.5 ohm) scanned at about 1 mV/s. The samples were pre-activated at chronoamperometry measurement for over about half hour.

Figure 41:
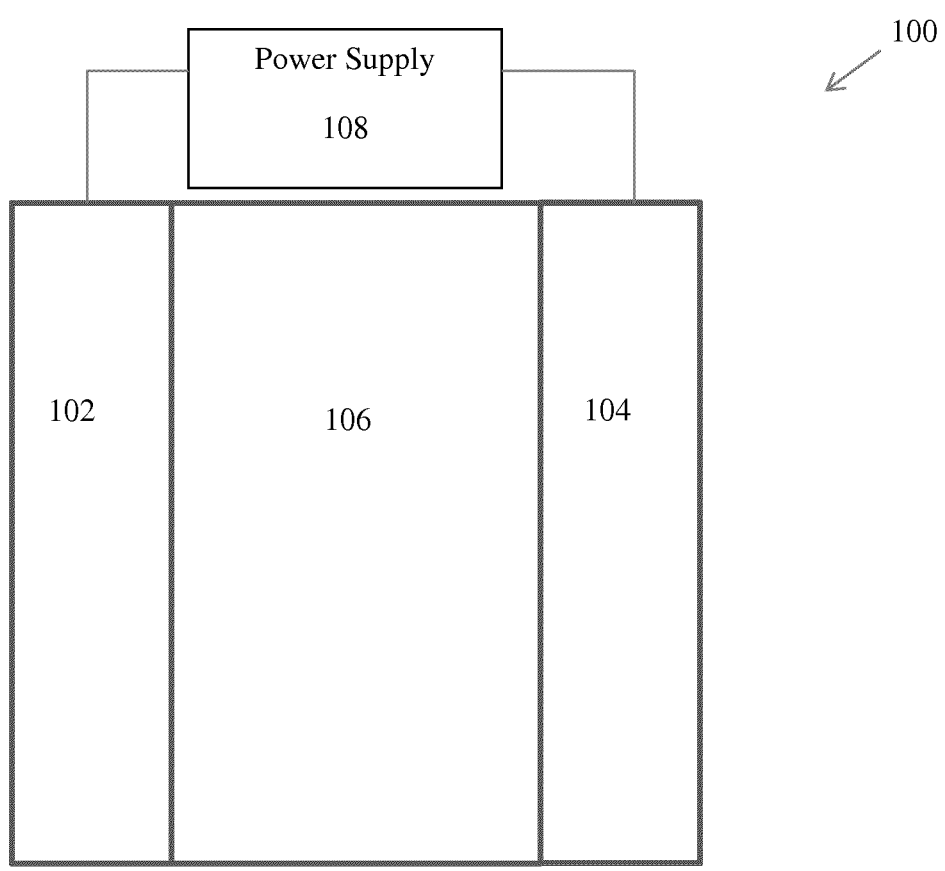

FIG. 41. Schematic of a water electrolyzer according to an embodiment of this disclosure.

Figure 42:
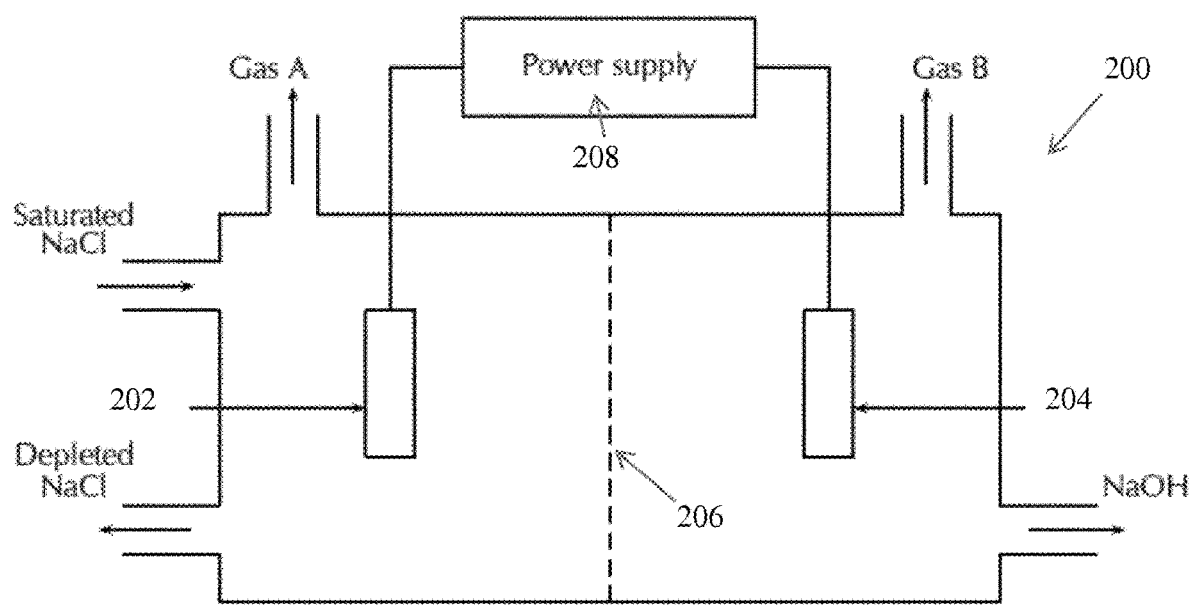

FIG. 42. Schematic of a chloralkali cell according to an embodiment of this disclosure.

DETAILED DESCRIPTION

Embodiments of this disclosure are directed to heterostructures for ultra-active and stable catalysis of HER. In some embodiments, low-pressure annealing of a metal or mixed metal hydroxide precursor can lead to decomposition into metal oxide/metal heterostructures, and these heterostructures are ultra-active for HER. Annealing of a precursor in the presence of a suitable substrate, such as oxidized carbon nanotubes or a metallic foam, can induce the formation of metal oxide/metal heterostructures. For example, annealing of a nickel hydroxide precursor infiltrated into or coated on a metallic foam, such as a Ni foam or a copper (Cu) foam, can yield NiO/Ni heterostructures, in which cores of Ni are partially covered or surrounded by incomplete shells of NiO. Partial coverage by incomplete shells promotes high activity of a resulting electrocatalyst, by exposing NiO/Ni interfaces as catalytic active sites. Introduction of chromium (Cr) or another suitable metal or metalloid in the precursor can form a phase of chromium oxide, such as in the form of $CrO_x$ or $Cr_2O_3$ nanoparticles partially covering Ni cores, which can greatly improve the HER stability of the catalyst.

Advantageously, a heterostructure electrocatalyst of embodiments of this disclosure can achieve both high activity and stability towards HER catalysis. In some embodiments, the high activity can be attributed to metal oxide/metal interfaces, which are exposed by partial coverage of a metal by a metal oxide, such as cores of Ni partially covered by incomplete shells of NiO. In some embodiments, the high stability can be attributed to the presence or introduction of another metal or metalloid, such as Cr, which can effectively impede oxidation of a metal such as Ni to retain metal oxide/metal interfaces as catalytic active sites. Example applications include the use as cathodes for water splitting production and chloralkali industry, such as in water electrolyzers and chloralkali cells.

As shown in an embodiment of FIG. 41, a water electrolyzer 100 includes an anode 102, a cathode 104, and an electrolyte 106 disposed between and in contact with the anode 102 and the cathode 104. The anode 102 is configured to promote water oxidation or oxygen evolution reaction (OER) and includes an OER electrocatalyst affixed to a substrate. Examples of suitable OER catalysts include stainless steel, and metal and mixed metal-layered double hydroxides, amongst others. The cathode 104 is configured to promote water reduction or HER and includes a HER electrocatalyst affixed to a substrate. Further details of components of the cathode 104 are provided below. The electrolyte 106 is an aqueous electrolyte and can be alkaline, acidic, or neutral. As shown in FIG. 41, the water electrolyzer 100 also includes a power supply 108, which is electrically connected to the anode 102 and the cathode 104 and is configured to supply electricity to promote OER and HER at the anode 102 and the cathode 104, respectively. The power supply 108 can include, for example, a primary or secondary battery or a solar cell. Although not shown in FIG. 41, a selectively permeable membrane or other partitioning component can be included to partition the anode 102 and the cathode 104 into respective compartments.

In the embodiment of FIG. 41, the cathode 104 includes a heterostructure electrocatalyst affixed to a porous substrate. In general, a heterostructure of some embodiments can include a phase of a first material and a phase of a second material, where the phases are joined together or next to one another, where the first material and the second material are different, and where the phase of the second material partially covers or surrounds the phase of the first material such that interfaces between the first material and the second material remain exposed or uncovered as catalytic active sites. In some embodiments, the first material can include a first metal, and the second material can include a second metal that is the same as or different from the first metal. For example, the first metal and the second metal can be the same transition metal but having different oxidation states, such as an oxidation state of 0 for the first metal, and an oxidation state $\geq+1$, $\geq+2$, $\geq+3$, or $\geq+4$ for the second metal. As a specific example, the first metal can be nickel having an oxidation state of 0, such as in the form of elemental nickel, and the second metal can be nickel having an oxidation state of +2, such as in the form of nickel oxide. Another metal can be included in the first material in place of, or in combination with, nickel, such as iron (Fe), cobalt (Co), Cu, or another first row transition metal. For example, the first material can include two or more different metals, such as in the form of a metal alloy. Also, an oxide of another metal or a metalloid can be included in the second material in place of, or in combination with, nickel oxide, such as an oxide of (1) Fe, Co, Cu, or another first row transition metal, (2) aluminum (Al) or another post-transition metal, (3) lanthanum (La), cerium (Ce), or another lanthanide, or (4) silicon (Si) or another metalloid. As a specific example in addition to NiO/Ni heterostructures, other metal oxide/metal heterostructures can be $CoO_x$/Ni heterostructures. In some embodiments, the second material can include a third metal that is different from the first metal and the second metal, and that can effectively impede oxidation of the first metal to retain interfaces between the first metal and an oxide of the second metal as catalytic active sites. The third metal can be included in the form of an oxide, and the oxide of the third metal and the oxide of the second metal can be segregated into separate domains, or can be co-localized in the form of a mixed oxide of the second metal and the third metal. For example, the first metal and the third metal can be different transition metals, and where the first metal can have an oxidation state of 0, and the third metal can have an oxidation state of ≥+1, ≥+2, ≥+3, or ≥+4. The oxidation state of the second metal can be the same as or different from the oxidation state of the third metal. As a specific example, the first metal can be nickel having an oxidation state of 0, such as in the form of elemental nickel, the second metal can be nickel having an oxidation state of +2, such as in the form of nickel oxide, and the third metal can be chromium having an oxidation state of +3, such as in the form of chromium oxide. An oxide of another metal or a metalloid can be included in the second material in place of, or in combination with, chromium oxide, such as an oxide of (1) titanium (Ti) or another first row transition metal or (2) Si or another metalloid.

Heterostructures can have a variety of morphologies, such as core-shell, core-multi-shell, and nanoparticle-decorated core, amongst others. For example, heterostructures of some embodiments can be in the form of nanoparticles having sizes in the range from about 1 nm to about 200 nm, from about 1 nm to about 150 nm, from about 2 nm to about 100 nm, or from about 2 nm to about 50 nm, and where each nanoparticle includes a core of a first material and an incomplete shell of a second material partially covering the core of the first material, with the incomplete shell being non-continuous and having one or more gaps to expose at least a portion of the core. In some embodiments, the core can include a first metal, and the incomplete shell can include an oxide of a second metal and an oxide of a third metal, and the third metal is different from the first metal and the second metal. In additional embodiments, the core can include a first metal, and the incomplete shell can include a mixed oxide of a second metal and a third metal, and the third metal is different from the first metal and the second metal.

In some embodiments, partial coverage of a phase of a first material by a phase of a second material in heterostructures can be characterized according to X-ray photoelectron spectroscopy (XPS) or another surface spectroscopy technique. In the case of XPS, for example, an initial scan can be performed (without sputtering) to evaluate atomic composition of surfaces of heterostructures to a depth of up to about 2 nm, and surface atomic concentration ratios can be evaluated according to ratios of characteristic peak intensities. In some embodiments, a surface atomic concentration ratio of a second metal (included in the phase of the second material) relative to a first metal (included in the phase of the first material) can be up to about 50/1, up to about 45/1, up to about 40/1, up to about 35/1, up to about 30/1, up to about 25/1, up to about 20/1, up to about 15/1, up to about 10/1, up to about 9/1, up to about 8/1, or up to about 7/1, and down to about 5/1, down to about 4/1, down to about 3/1, down to about 2/1, down to about 1/1, down to about 2/3, down to about 3/7, or less. In some embodiments where a third metal is included in the phase of the second material, a sum of a surface atomic concentration ratio of the third metal relative to the first metal and the surface atomic concentration ratio of the second metal relative to the first metal can be up to about 50/1, up to about 45/1, up to about 40/1, up to about 35/1, up to about 30/1, up to about 25/1, up to about 20/1, up to about 15/1, up to about 10/1, up to about 9/1, up to about 8/1, or up to about 7/1, and down to about 5/1, down to about 4/1, down to about 3/1, down to about 2/1, down to about 1/1, down to about 2/3, down to about 3/7, or less.

In some embodiments, an amount of a second metal (included in a phase of a second material) can be characterized according to a ratio of a weight of an oxide of the second metal relative to a weight of a first metal (included in a phase of a first material), where the weight ratio of the oxide of the second metal to the first metal can be up to about 3/2, up to about 1/1, up to about 2/3, up to about 3/7, or up to about 1/4, and down to about 1/5, down to about 1/6, down to about 1/7, or less. In some embodiments, an amount of a third metal (included in the phase of the second material) can be characterized according to a ratio of a weight of an oxide of the third metal relative to the weight of the first metal, where the weight ratio of the oxide of the third metal to the first metal can be up to about 1/4, up to about 1/5, up to about 3/20, or up to about 1/10, and down to about 1/15, down to about 1/20, down to about 1/25, down to about 1/30, or less.

Heterostructures can be affixed to a porous substrate. In some embodiments, a characteristic of a porous substrate is its porosity, which is a measure of the extent of voids resulting from the presence of pores or any other open spaces, and heterostructures can be disposed in the voids of the porous substrate. A porosity can be represented as a ratio of a volume of voids relative to a total volume, namely between 0 and 1, or as a percentage between 0% and 100%. In some embodiments, a porous substrate can have a porosity that is at least about 0.05 or at least about 0.1 and up to about 0.98 or more, and, more particularly, a porosity can be in the range of about 0.1 to about 0.98, about 0.2 to about 0.98, about 0.3 to about 0.98, about 0.4 to about 0.95, about 0.5 to about 0.95, about 0.6 to about 0.95, or about 0.7 to about 0.95. Techniques for determining porosity include, for example, porosimetry and optical or scanning techniques. Examples of suitable porous substrates include metallic foams, such as Ni foams, Cu foams, Ti foams, and Al foams, and non-metallic foams, such as carbon foams, graphite foams, and graphene foams. Other catalyst supports or substrates can be included in place of, or in combination with, metallic or non-metallic foams, such as single-walled carbon nanotube networks, multi-walled carbon nanotube networks, and other carbon-based or non-carbon-based supports like carbon fiber paper or carbon cloth. In some embodiments, a Brunauer-Emmett-Teller (BET) surface area of an electrocatalyst-substrate can be at least about 90 m$^2$/g, at least about 100 m$^2$/g, at least about 110 m$^2$/g, at least about 120 m$^2$/g, at least about 130 m$^2$/g, at least about 140 m$^2$/g, or at least about 150 m$^2$/g, and up to about 200 m$^2$/g, up to about 300 m$^2$/g, up to about 500 m$^2$/g, or more.

In some embodiments, heterostructures can be formed according to a manufacturing method including: (1) providing a precursor composition including one or more metals; (2) applying the precursor composition to a porous substrate to form a coated porous substrate; and (3) annealing the coated porous substrate to form heterostructures of the metals affixed to the porous substrate. In some embodiments, the precursor composition can be provided by mixing or otherwise combining a solution of a first metal-containing salt, a solution of a second metal-containing salt, and a solution of a third metal-containing salt, followed by hydrolysis to form metal or mixed metal hydroxide precursors. In the case where the first metal and the second metal are the same, a separate solution of the second metal-containing salt can be omitted. In some embodiments, applying the precursor composition to the porous substrate can be performed by drop-drying, soaking, immersion, or other suitable coating technique. A polar solvent or a surfactant can be applied to the porous substrate to wet the porous substrate, prior to applying the precursor composition. Examples of suitable polar solvents include alcohols, amongst other polar protic organic solvents and polar aprotic organic solvents. Examples of suitable surfactants include ionic surfactants, anionic surfactants, cationic surfactants, and amphoteric surfactants. It is also contemplated that separate solutions of different metal-containing salts can be applied to the porous substrate, whether in parallel or sequentially. In some embodiments, annealing the coated porous substrate can be performed at a pressure up to about 500 torr, up to about 400 torr, up to about 300 torr, up to about 200 torr, up to about 100 torr, up to about 50 torr, up to about 10 torr, or up to about 5 torr, and down to about 1 torr, down to about 0.1 torr, or less, and at a temperature up to about 450° C., up to about 400° C., up to about 350° C., or up to about 320° C., and down to about 250° C., down to about 200° C., or less. Annealing can be performed in the presence or under a flow of an inert gas, such as argon (Ar). In some embodiments, a two-stage annealing can be performed at about 300° C. in an Ar flow at a pressure of about 1 atm for about 1 hour, followed by annealing at about 300° C. in an $H_2$/Ar flow at a pressure of about 1 atm or about 3 torr for about 1 hour.

As shown in another embodiment of FIG. 42, a chloralkali cell 200 includes an anode 202, a cathode 204, and a selectively permeable membrane 206 partitioning the anode 202 and the cathode 204 into respective compartments. A saturated brine enters the compartment housing the anode 202 via a brine inlet, which is configured to oxidize chlorine anions to form chlorine gas that is released via a gas outlet, and a deplete brine exists the compartment via a brine outlet. The cathode 204 is configured to reduce water to form sodium hydroxide and hydrogen gas, which are released via respective outlets. As shown in FIG. 42, the chloralkali cell 200 also includes a power supply 208, which is electrically connected to the anode 202 and the cathode 204 and is configured to supply electricity to promote reactions at the anode 202 and the cathode 204. In the embodiment of FIG. 42, the cathode 204 includes a heterostructure electrocatalyst affixed to a porous substrate. Certain aspects of the chloralkali cell 200 can be similarly implemented as explained for the water electrolyzer 100 of FIG. 41, and details are not repeated.

Advantages of some embodiments include one or more of the following: (1) Highly scalable and inexpensive synthesis of electrocatalysts: the synthesis can involve low-temperature hydrolysis of inexpensive metal-containing salts into metal or mixed metal hydroxides, followed by low-pressure and low-temperature annealing at, for example, about 300° C. Precious metal and high temperature sintering can be avoided. (2) Ultra-active and stable: the activity can be comparable to Pt. With the introduction of Cr, high stability can be attained with little or no noticeable decay in catalytic activity over several days or weeks.

Additional embodiments and variations are contemplated, including one or more of the following: (1) The synthesis can involve: a. mixing a nickel-containing salt with sodium hydroxide to form nickel hydroxide particles. b. loading the nickel hydroxide particles into Ni foam. c. anneal at about 300° C. in vacuum or under low pressure. (2) The HER catalytic activity can be extended to others electrolytes in acidic, neutral, and alkaline conditions. (3) The structure can be further extended to other metal oxide/metal heterostructures. (4) Further improvements of the electrocatalyst can be attained by introducing additional active metal oxide/metal interfaces, such as through the introduction of zinc (Zn).

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Nanoscale NiO/Ni Heterostructures for Ultra-Active Hydrogen Evolution Electrocatalysis Overview:

Active, stable, and cost-effective electrocatalysts are desirable for water splitting for $H_2$ production through electrolysis or photoelectrochemistry. Here, this example sets forth the development of nanoscale NiO/Ni heterostructures formed on carbon nanotube (CNT) sidewalls as highly effective electrocatalysts for HER with activity comparable to platinum. Partially reduced Ni interfaced with NiO are resulted from low-pressure thermal decomposition of $Ni(OH)_2$ precursors bonded to CNT sidewalls. The $Ni^{2+}$-CNT interactions impede complete reduction and Ostwald ripening of Ni species into the less HER active pure Ni phase. Further doping the $Ni(OH)_2$/ox-CNT precursor with Cr forms a ternary structure of NiO/Ni core coated by small $CrO_x$ nanoparticles, which drastically improve the HER catalyst stability by constraining particle growth and phase separation. A water electrolyzer with less than about 1.5 V onset voltage and excellent stability operated by a single-cell alkaline-battery is made by using inexpensive, non-precious, metal-based electrocatalysts.

As set forth in this example, a NiO/Ni heterojunction structure attached to mildly oxidized carbon nanotube (NiO/Ni-CNT) exhibits high HER catalytic activity comparable to commercial Pt/C catalysts in several types of basic solutions (pH=about 9.5-14). The NiO/Ni nanoscale heterostructures were created through low-pressure thermal annealing, affording partial reduction of $Ni(OH)_2$ coated on oxidized CNTs that acted as an interacting substrate to impede complete reduction and aggregation of Ni. The high catalytic activity of NiO/Ni-CNT towards HER provided a high performance electrolyzer with less than about 1.5 V onset potential.

Results

Figure 1:
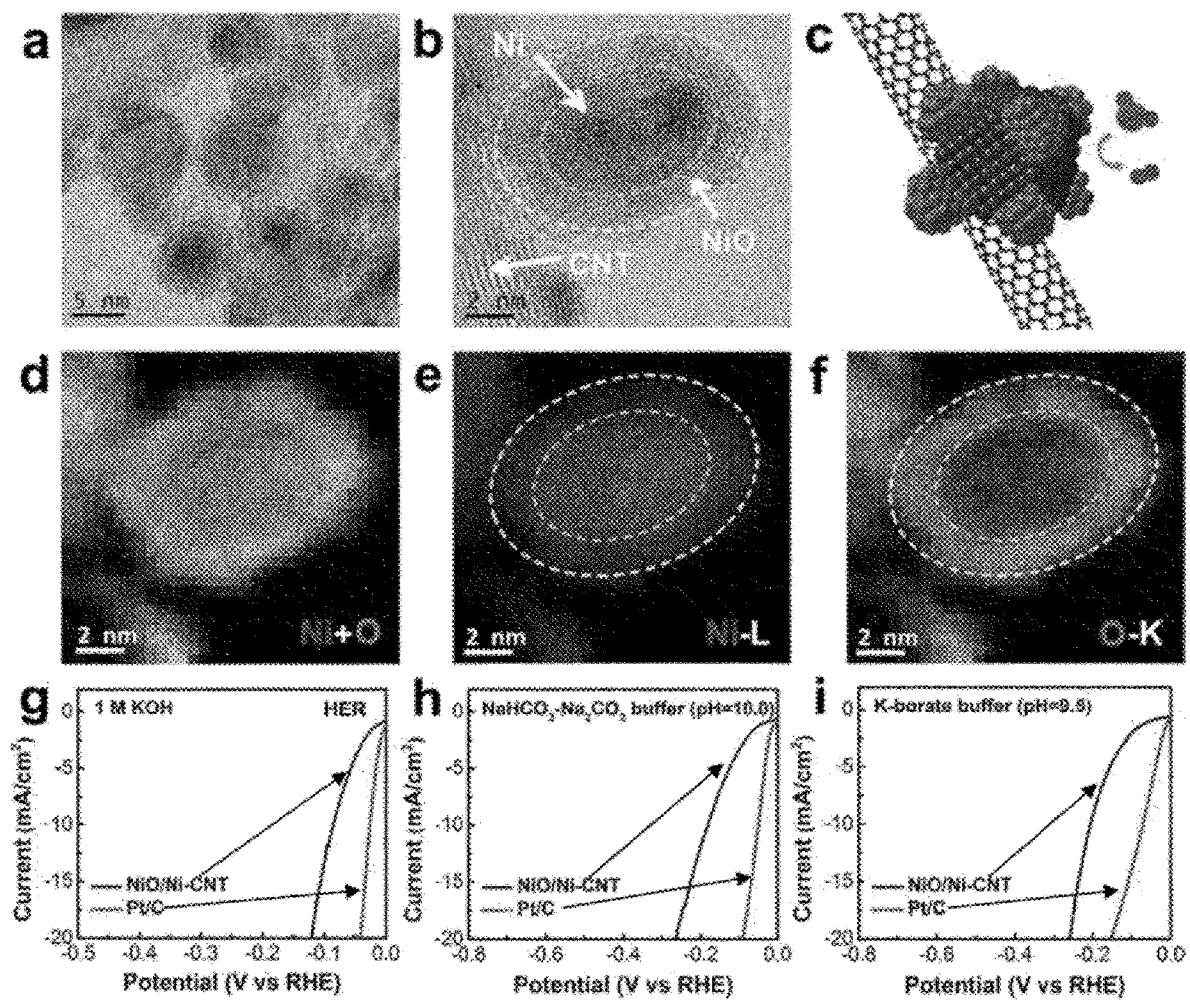
FIG. 1. Structure and performance of a highly active NiO/Ni-carbon nanotube (CNT) nanosized heterostructure for hydrogen evolution reaction. (*a*) Low magnification scanning transmission electron microscopy (STEM) bright field image showing the typical morphology of the NiO/Ni-CNT sample, with about 8-15 nm particles attached to CNTs. (*b*) Atomic resolution STEM bright field image showing the structure of a typical NiO/Ni particle on a CNT (small NiO nanoparticles over a larger Ni nanoparticle core.

Synthesis, Characterization, and HER Catalytic Activity of NiO/Ni-CNT:

NiO/Ni-CNT synthesis was performed by low temperature hydrolysis of Ni-containing salts into Ni hydroxide on the sidewalls of mildly oxidized CNT [$Ni(OH)_2$/ox-CNT], followed by a low-pressure (about 1.5 torr) annealing at about 300° C. in an Ar flow (see further details below). The synthesis was streamlined and can be readily scaled up for practical use. Scanning transmission electron microscopy (STEM) images revealed the presence of about 10 nm nanoparticles attached to multi-walled CNT (FIGS. 1a and 1b). Chemical mapping with electron energy-loss spectroscopy (EELS) resolved the distribution of O, Ni, and C with sub-nm spatial resolution, identifying a core-shell-like structure with 0 and Ni in the shell and primarily or exclusively Ni in the core (FIG. 1d-1f) over a CNT network. High-resolution STEM imaging (FIG. 1b and FIG. 6) and the corresponding chemical mapping (FIG. 1d) showed that the NiO shell was not uniform, containing small NiO domains with different orientations and might contain small gaps in the shell to expose some NiO/Ni nano-interfaces (FIG. 1c).

X-ray photoelectron spectroscopy (XPS) confirmed the NiO—Ni structure (FIG. 7b). The as-made material exhibited mostly $Ni^{2+}$ species on the surface with a weak shoulder peak at about 853 eV from $Ni^0$. Upon Ar ion sputtering of the surface, the detected Ni species were mostly Ni with decreased amount of $Ni^{2+}$, consistent with NiO-decorated Ni nanoparticles. The Ni K edge spectrum of the sample recorded by X-ray absorption near edge structure (XANES) spectroscopy further corroborated the co-existence of NiO and Ni (FIG. 7a). Since Ni K edge probed deeper into the material, the Ni/NiO ratio was estimated at about 73/27 by linear fitting of standard patterns.

The HER catalytic property of NiO/Ni-CNT was measured in a three-electrode configuration by with a rotating disk electrode (RDE) at about 1600 rpm to remove $H_2$ bubbles generated. Commercial Pt/C was investigated side-by-side under the same loading of about 0.28 mg/cm². In about 1 M potassium hydroxide (KOH), the NiO/Ni-CNT afforded almost no overpotential in the onset of HER catalysis with a slightly lower current compared to Pt/C and a Tafel slope of about 82 mV/decade (FIG. 1g and FIG. 14a; see also FIG. 19). Impressively, the NiO/Ni-CNT catalyst achieved an HER current density of about 10 mA/cm² at less than about 100 mV overpotential. Moreover, high performance HER catalysis by NiO/Ni-CNT was also observed in a carbonate/bicarbonate buffer (pH=about 10.0) and a borate buffer (pH=about 9.5) (FIGS. 1h and 1i).

NiO/Ni Nano-Interfaces as Active Sites for HER Catalysis:

When annealed at about 300° C. at a higher Ar pressure of about 1 atm (in contrast to about 1.5 torr for producing NiO/Ni-CNT), the same $Ni(OH)_2$ precursors on CNTs was transformed to pure about 3-4 nm NiO nanoparticles (NiO/CNT) (FIG. 2b and FIG. 8), indicating substantially no $Ni^{2+}$ reduction under a high annealing pressure with the release oxygen gas. On the other hand, $Ni^{2+}$ reduction was accelerated by raising the annealing temperature to about 500° C. in about 1.5 torr Ar, generating Ni nanoparticles (mostly greater than about 10 nm nanoparticles) nearly free of NiO on CNTs (Ni/CNT) (FIG. 2c, FIG. 8, and FIG. 16). The Ni surface oxidation state on NiO/CNT and Ni/CNT were confirmed to be +2 and 0 respectively by XPS and XANES spectra (FIGS. 2g and 2h) and by EELS chemical mapping (FIG. 2e, 2f and FIGS. 9, 10).

The Ni/CNT gave a similar Tafel slope in HER but a larger overpotential of about 130 mV compared to the about 0 mV overpotential for NiO/Ni-CNT. The NiO/CNT material afforded a much worse onset potential of about 400 mV, despite a smaller Tafel slope at the onset. These results indicated that the HER catalytic activity was facilitated by a synergistic effect between NiO and Ni in NiO/Ni-CNT (FIG. 15). Further, a comparison was made of HER activity of a physical mixture of Ni/CNT and NiO/CNT with Ni/CNT alone, without observing any difference, and both were inferior to NiO/Ni-CNT (FIG. 11).

Without wishing to be bound by a particular theory, it is proposed that the high HER catalytic activity of the NiO/Ni-CNT can be attributed to exposed NiO/Ni nano-interfaces provided by non-uniform coating of NiO nanoparticles on Ni cores. In alkaline media, the HER pathway can be through the Volmer-Heyrovsky process or Volmer-Tafel pathways.

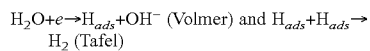
$H_2O+e \rightarrow H_{ads}+OH^-$ (Volmer) and $H_{ads}+H_{ads} \rightarrow H_2$ (Tafel)

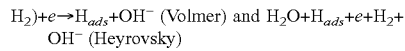
$H_2)+e \rightarrow H_{ads}+OH^-$ (Volmer) and $H_2O+H_{ads}+e \rightarrow H_2+OH^-$ (Heyrovsky)

Both pathways involve adsorption of $H_2O$ molecule, electrochemical reduction of adsorbed $H_2O$ into adsorbed $OH^-$ and H atom, desorption of $OH^-$ to refresh the surface, and formation of H adsorbed intermediate for $H_2$ generation. At a NiO/Ni interface, density functional theory (DFT) calculations determined that $H_2O$ could favorably adsorb at the interface with a relatively high binding energy (see Table 1 below), which should facilitate water reduction and splitting by introducing more reactants on the catalytic sites. The $OH^-$ generated by $H_2O$ splitting could preferentially attach to a NiO site at the NiO/Ni interface due to strong electrostatic affinity to the locally positively charged $Ni^{2+}$ species and more unfilled d orbitals in $Ni^{2+}$ than Ni metal. The H atom could favorably adsorb onto the Ni site with a moderate binding energy of about −0.48 eV based on DFT calculations (Table 1) for further Tafel or Heyrovsky reaction. On a pure Ni surface without any NiO, the adsorbed $OH^-$ species could occupy the sites for H atom, causing inefficient release of $OH^-$ and blocking of the active catalytic sites. On a pure NiO surface, the H atom could not be moderately bound with significantly higher binding energy on the O sites and lower binding energy on the Ni sites than on Ni(111) (Table 1). Too strong adsorption would not favor $H_2$ generation, while too weak adsorption would not favor intermediate formation. Thus, it is proposed that NiO/Ni nano-interfaces are important for HER catalysis by removing $OH^-$ generated on NiO and refreshing Ni surfaces for moderate H atom adsorption and $H_2$ evolution.

Role of CNT in NiO/Ni Heterostructure Synthesis:

It is noted that the formation of NiO/Ni heterostructure was promoted by the oxidized CNT growth substrate. Without any CNT as support in some instances, the same reaction steps produced aggregated Ni particles in a plate-like morphology (FIG. 3a) with lower HER activity than NiO/Ni-CNT (FIG. 3b and FIG. 12), in strong contrast to the small nanoparticle structure of NiO/Ni on CNT (FIG. 3a). These results indicated that, on oxidized CNTs, the reduction of oxidized Ni species during thermal decomposition was impeded or retarded likely due to pinning or interactions of Ni species with oxidized CNTs through oxygen functional groups, delaying the reduction of Ni into larger aggregates via Oswald ripening. These results underscored that substrate-precursor interaction can affect the morphology, structure and catalytic activity of materials (FIG. 17).

Improved HER Stability of $CrO_x$ Scaffold on NiO/Ni-CNT:

Towards electrolysis applications, the NiO/Ni-CNT material was loaded into Ni foam at a high loading of about 8 mg/cm² (based on mass of NiO/Ni). The HER catalytic activity of the resulting electrode was high in about 1 M KOH, showing less than about 100 mV overpotential at a current density of about 100 mA/cm² and an impressively low Tafel slope of about 51 mV/decade (FIG. 4a and FIG. 14b). There was just a slight difference in activity between NiO/Ni-CNT and precious metal Pt/C catalyst (about 20 mV at about 20 mA/cm² and about 50 mV at about 100 mA/cm²). Compared to bare Ni foam that resembled Ni foil used in industrial water splitting, the NiO/Ni-CNT electrode afforded a gain of about 200 mV lower in voltage (FIG. 4a). Similar gain of about 300 mV over Ni foam was obtained in bicarbonate-carbonate buffer and borate buffer electrolytes respectively (FIGS. 13a and 13b). However, when holding constant potential at about −0.7 V vs RHE, the NiO/Ni-CNT catalyst lost about 22% of the initial current over 2 days of HER catalysis. To glean into the decay mechanism of NiO/Ni-CNT, STEM analysis was performed of the catalyst after long term operation at HER condition (FIGS. 4c and 4d). Significant particle aggregation (about 20-30 nm compared to about 5-10 nm) (FIG. 4c) and some phase separation between Ni and NiO (FIG. 4d) could be observed, and the loss of NiO/Ni interfaces could contribute to the decay over time. To improve the HER stability, the Ni(OH)$_2$/CNT material is doped with Cr, which induced the formation of NiCr layered double hydroxide (NiCr LDH) phase. Upon annealing at about 300° C. in about 1.5 torr Ar, CrO$_x$ formed outside of a NiO/Ni core (CrO$_x$—NiO/Ni-CNT), serving as a scaffold holding the NiO/Ni centers (FIG. 4e). In strong contrast to the NiO/Ni-CNT, the CrO$_x$—NiO/Ni-CNT showed no noticeable decay over 2 days operation under bias (FIG. 4b), and the structure was maintained without phase separation after the long term stability test (FIG. 4f). The much improved stability is attributed to the CrO$_x$ scaffold that fixes the NiO/Ni, impeding it from aggregation and phase separation.

Water Electrolysis with Voltage Less than about 1.5 V by NiO/Ni-CNT and NiFe LDH:

To demonstrate the use of the NiO/Ni-based catalyst for water electrolysis application, an electrolyzer was made using NiO/Ni-CNT as a water reduction catalyst and a high performance NiFe-layered double hydroxide (NiFe LDH) water oxidation catalyst. The experiment was carried out in about 1 M KOH at room temperature (about 23° C.) and about 60° C. A water electrolysis onset of less than about 1.5 V and a high current density of about 100 mA/cm$^2$ at about 1.58 V were observed at room temperature (FIG. 5a and FIG. 18). Notably, this demonstrates the ability to achieve less than about 1.5 V onset for water electrolysis using non-precious catalysts for both electrodes. Such water electrolysis could be powered by a single-cell AAA battery with a nominal voltage of about 1.5 V (FIG. 5c). The kinetics and thermodynamics were greatly improved at high temperature (about 60° C.), showing lower onset potential of about 1.4 V and a higher current increase, reaching about 100 mA/cm$^2$ at a voltage of about 1.45 V (FIG. 5a) with good stability (FIG. 5b; see also FIG. 20). Moreover, the CrO$_x$—NiO/Ni-CNT is paired with the NiFe LDH for an electrolyzer with even better stability, and the electrolyzer showed similar activity for water electrolysis but much less decay (less than about 20 mV over 1 week) compared to the one with NiO/Ni-CNT (FIG. 5d). The result indicated that the NiO/Ni heterostructure catalyst could match the benchmark Pt/C catalyst for efficient electrolyzers with ultralow onset potential for water splitting devices, and also compares favorably with other representative catalysts (see Table 2 below).

Methods

Oxidization of Multi-Walled Carbon Nanotubes (MW-CNTs):

MWCNTs were oxidized by a modified Hummers method. About 1 g MWCNTs were purified by calcinations at about 500° C. and washing with about 40 ml of diluted hydrochloric acid (about 10 wt %) to remove metal residues and amorphous carbon. The purified MWCNTs were repeatedly washed with water and collected. After drying overnight, about 23 ml of concentrated sulfuric acid was mixed with the purified MWCNTs (about 0.99 g) in a 250 ml round flask and stirred at room temperature for about 12 hours. Subsequently, the round flask was heated to about 40° C. in an oil bath, followed by slow addition of about 100 mg NaNO$_3$ and about 1 g KMnO$_4$ (about the same as the mass of purified MWCNTs). After stirring at about 40° C. for about 30 min, about 3 ml of water was added, followed by another about 3 ml after about 5 minutes. About 40 ml of water was slowly added about 5 minutes later to keep the temperature below about 45° C. After about 15 minutes, about 140 ml of water was poured into the solution at room temperature, followed by addition of about 10 ml of about 30% H$_2$O$_2$ to stop the reaction after about 10 minutes. Oxidized MWCNTs were collected, washed with diluted HCl solution (about 5 wt %) twice and then water repeatedly until the pH is higher than or equal to about 5. The final suspension (in H$_2$O) was lyophilized to yield solid oxidized MWCNTs.

Synthesis of NiO/Ni-CNT, Ni/CNT, NiO/CNT, CrO$_x$—NiO/Ni-CNT Hybrids, and Pure Nanoparticle:

In a typical synthesis of NiO/Ni-CNT, about 4 mg oxidized MWCNTs were sonicated in about 8 ml of anhydrous N,N-dimethylformamide (DMF) for about 10 min, followed by addition of about 800 μl of about 0.2 M nickel acetate (Ni(OAc)$_2$) aqueous solution. The mixture was vigorously stirred at about 90° C. in an oil bath for about 4 hours. Afterwards, the suspension was centrifuged and washed with H$_2$O twice to get rid of DMF. The re-suspended solution was lyophilized to yield solid Ni(OH)$_2$/ox-CNT. The solid Ni(OH)$_2$/ox-CNT was then annealed in a tube furnace at about 300° C. and substantially constant pressure of about 1.5 torr under Ar atmosphere (about 100 sccm) for about 1 hour. The furnace was constantly pumped to get rid of the H$_2$O and O$_2$ generated during the reaction and maintain low pressure in the furnace. After that, the furnace was slowly cooled down to room temperature in about 30 min, and the NiO/Ni-CNT catalyst was taken out and ready for use. Ni/CNT was synthesized by the same procedure with raised temperature to about 500° C. for the annealing process. NiO/CNT was synthesized by the same procedure with no pumping (about 400 sccm Ar atmosphere, about 1 atm pressure) for the annealing process. CrO$_x$—NiO/Ni-CNT was synthesized by the same procedure with addition of about 32 μl of about 0.5 M Cr(NO$_3$)$_3$ aqueous solution in the precursor. Pure nanoparticles were synthesized by typical procedures of NiO/Ni-CNT synthesis without CNT precursors.

In another synthesis, about 4 mg of oxidized MWCNTs were sonicated in about 8 ml of anhydrous N,N-dimethylformamide (DMF) for about 10 min, followed by addition of about 800 μl of about 0.2 M nickel acetate (Ni(OAc)$_2$) aqueous solution. The mixture was vigorously stirred at about 90° C. in an oil bath for about 4 hours. Afterwards, the suspension was centrifuged and washed with H$_2$O twice to get rid of DMF. The re-suspended solution was lyophilized to get solid Ni(OH)$_2$/ox-CNT. The solid Ni(OH)$_2$/ox-CNT was then annealed in a tube furnace at about 300° C. under about 1 atm Ar atmosphere (about 400 sccm) for about 1 hour. After that, the solid was further annealed at about 300° C. under H$_2$/Ar atmosphere (about 3 torr with about 20 sccm H$_2$/about 100 sccm Ar or about 1 atm with about 80 sccm H$_2$/about 400 sccm Ar) for about 1 hour. The catalyst was taken out and ready for use.

Synthesis of NiFe LDH Nanoparticles:

In a typical procedure, about 160 μl of about 0.5 M Ni(OAc)$_2$ aqueous solution and about 32 μl of about 0.5 M Fe(NO$_3$)$_3$ were mixed with about 4 ml DMF by stirring. The mixture was heated to and maintained at about 120° C. for about 16 hours in an autoclave. The temperature was then raised to about 160° C. for about 2 hours. After cooling down to room temperature, the sample was collected, centrifuged, washed with water and finally lyophilized to yield solid NiFe LDH nanoparticles.

Materials Characterizations:

X-ray photoelectron spectroscopy (XPS) samples were drop-dried onto silicon substrate and measured on a PHI VersaProbe Scanning XPS Microprobe. Transmission electron microscopy (TEM) and electron energy loss spectroscopy (EELS) mapping were performed on a Nion Ultra-STEM, operated at 60 kV. X-ray absorption near edge structure (XANES) measurements were carried out at a SGM beamline of the Canadian Light Source. XANES spectra were measured on indium foil in the surface sensitive total electron yield (TEY). Prior to sample measurement, data were first normalized to the incident photon flux $I_0$ measured with a refreshed gold mesh. After measurement, data were further normalized to the edge jump between pre-edge platform and post-edge platform.

Sample Preparation for Electrochemical Measurement.

To prepare the NiO/Ni-CNT on a RDE, about 1 mg NiO/Ni-CNT hybrid was mixed with about 190 µl water, about 50 µl ethanol, and about 10 µl of about 5 wt % Nafion solution by at least about 30 min sonication to form a homogeneous ink. Subsequently, about 20 µl suspension (containing about 80 µl catalyst) was drop-dried onto a glassy carbon electrode of about 5 mm in diameter (loading of about 0.40 mg/cm$^2$). To prepare the NiO/Ni-CNT on Ni foam electrode, Ni(OH)$_2$/ox-CNT was collected after about 85° C. oil bath process and washed with ethanol once. Ni(OH)$_2$/ox-CNT was then re-dispersed in about 2 ml ethanol. After sonication for about 10 minutes, the suspension was drop-dried onto about 1 cm×about 1 cm Ni foam (about 2-mm thick, about 100 ppi, about 95% porosity, Marketech) at about 90° C. The electrode was further heated at about 120° C. for about 20 min till fully dry. The as-prepared electrode was annealed in a tube furnace at about 300° C. and constant pressure of about 1.5 torr under Ar atmosphere (about 100 sccm) for about 1 hour, same as the typical procedure. The electrode with catalyst was ready for use after the annealing. The loading of NiO/Ni-CNT was determined to be about 11 mg/cm$^2$ (including CNTs) by the difference of the weight of Ni foam before and after loading. The NiFe LDH on Ni foam electrode was produced by drop-drying about 8 mg NiFe LDH (in about 2 ml ethanol+about 3 wt % PTFE) onto about 1 cm×about 1 cm Ni foam.

Electrochemical Measurement:

HER catalytic activity measurement was performed in a standard three electrode system controlled by a CHI 760D electrochemistry workstation. Catalyst powders cast on a RDE or a Ni foam were used as a working electrode, graphite rod as a counter electrode and a saturated calomel electrode as a reference electrode. The reference was calibrated against and converted to reversible hydrogen electrode (RHE). The RDE electrode was constantly rotating at about 1600 rpm to get rid of the bubbles during the measurement. Water electrolysis measurement was carried out in a standard two electrode system by using NiO/Ni-CNT on Ni foam as a cathode and NiFe LDH on Ni foam as an anode. Linear sweep voltammetry was carried out at about 1 mV/s for the polarization curves. Chronopotentiometry was measured under a constant current density of about 20 mA/cm$^2$. All polarization curves were iR-corrected.

Supplementary Experiment Details

Computational Method:

The Vienna Ab Initio Simulation Package (VASP) was employed in the periodic density functional theory (DFT) calculations to determine the adsorption energies of H atom and H$_2$O molecule. The projector-augmented waves (PAW) generalized gradient approximation (GGA) was used to determine the exchange and correlation energies. In the plane wave calculations, a cutoff energy of about 500 eV was applied, which was automatically set by the total energy convergence calculation.

To investigate the insight of HER under alkaline condition, three catalyst systems were adopted, including Ni(111), Pt(111), and NiO/Ni(111). Each metal (111) surface model includes 3 layers with sixteen atoms per layer, and a NiO cluster (Ni$_6$O$_6$) constructed based on NiO(111) was placed on Ni(111) surface to simulate NiO—Ni interface. The surface is constructed as a slab model within the three-dimensional periodic boundary conditions, and models are separated from their images in the direction perpendicular to the surface by an about 14 Å vacuum layer. The bottom layer was kept fixed to the bulk coordinates, while full atomic relaxations were allowed for the other top layers. For these calculations, a 3×3×1 k-Point mesh was used in the 4×4 supercell.

In this example, the adsorption energies of the possible HER intermediates including H and H$_2$O have been calculated. Here the adsorption energy is specified as the change in the potential energy E of the system (slab+adsorbate) on adsorption:

$$\Delta E_{ads} = E_{slab+adsorbate} - (E_{slab} + E_{adsorbate})$$

TABLE 1

H adsorption and H$_2$O adsorption energies on Ni(111), NiO/Ni(111), Pt(111) and NiO(111)[a]

| | H adsorption | | H$_2$O adsorption | |
|---|---|---|---|---|
| | $E_H$ | site | $E_{H2O}$ | site |
| Ni (111) | −0.526 | FCC | −0.295 | Top |
| | | | −0.060 | bridge[c] |
| NiO/Ni (111) | −0.482 | FCC[b] | −0.400 | on Ni of NiO |
| | | | −0.549 | Interface |
| | | | −0.273 | on Ni (111)-Top |
| Pt (111) | −0.568 | Top | −0.342 | Top |
| NiO (111) | −1.427 | on O | | |
| | +0.836 | on Ni | | |

[a]See the Experimental Details for calculation details
[b]FCC site of Ni (111) on NiO/Ni (111) surface
[c]Long Ni—Ni bridge site Similarly moderate H adsorption energies can be observed on Ni(111), NiO/Ni(111), and Pt (111) surfaces, while too strong or too weak H adsorption energy was observed on O and Ni of NiO, indicating that NiO is not an ideal HER catalyst. Higher H$_2$O adsorption energy can be observed at the NiO/Ni interface than Ni and Pt, leading to more adsorbed H$_2$O ready for splitting at the initial stage.

TABLE 2

Summary of the HER catalytic activity of representative catalysts

| Catalyst | Loading (mg cm$^{-2}$) | Electrolyte | Overpotential (mV) | Current density (mA cm$^{-2}$) |
|---|---|---|---|---|
| NiO/Ni-CNT | 0.28 | 1M KOH | 80 | 10 |
| NiO/Ni-CNT | 8 | 1M KOH | 95 | 100 |
| Ni—Mo nanopowder | 1.0 | 2M KOH | 70 | 20 |
| Ni—Mo nanopowder | 3.0 | 0.5M H$_2$SO$_4$ | 80 | 20 |
| Ni—Mo nanopowder | 13.4 | 2M KOH | 100 | 130 |
| CoP on Ti | 0.2 | 0.5M H$_2$SO$_4$ | ~85 | 20 |
| Ni$_2$P | 1 | 0.5M H$_2$SO$_4$ | 130 | 20 |
| MoS$_2$/RGO | 0.28 | 0.5M H$_2$SO$_4$ | 150 | 10 |
| Ni—Mo on Ni | 40 | 1M KOH | 110 | 400 |
| Ni—Mo—N nanosheet | 0.25 | 0.1M HClO$_4$ | 200 | 3.5 |
| Mo$_2$C/CNT | 2 | 0.1M HClO$_4$ | ~150 | 10 |

Example 2

Blending $Cr_2O_3$ into NiO—Ni Electrocatalyst for Superior Water Splitting

Overview:

The rising $H_2$ economy demands active and durable electrocatalysts based on low cost, earth-abundant materials for water electrolysis or photolysis. Here this example reports nanoscale Ni metal cores over-coated by a $Cr_2O_3$ blended NiO layer synthesized on metallic foam substrates. The Ni@NiO/$Cr_2O_3$ tri-phase material exhibits superior activity and stability similar to Pt for HER electrocatalysis in basic solutions. The chemically stable $Cr_2O_3$ serves for preventing oxidation of the Ni core, maintaining abundant NiO/Ni interfaces as catalytically active sites in the heterostructure and thus imparting high stability to the hydrogen evolution catalyst. The highly active and stable electrocatalyst provides an alkaline electrolyzer operating at about 20 mA/cm$^2$ at a voltage less than about 1.5 V, lasting longer than 3 weeks without noticeable decay. The non-precious metal catalysts afford a high efficiency of about 15% for light driven water splitting using GaAs solar cells. Similar water splitting efficiency can be achieved with a 20 mW/cm$^2$ LED desk light, opening the possibility of waste photo-energy utilization during nighttime.

Introduction:

Hydrogen ($H_2$) is considered a promising energy resource for its high gravimetric energy density and zero emission of greenhouse gas. However, $H_2$ production has largely relied on steam reforming, suffering from dependence on natural gas, high cost and low purity. Alternatively, $H_2$ can be produced by water splitting, which can potentially benefit from abundant water resources and high $H_2$ purity. A desirable scenario involves a closed cycle of $H_2$ production by water electrolysis/photolysis and $H_2$ consumption into water by $H_2$ fuel cells. The current constraint lies in the low efficiency of energy conversion due to the sluggish nature of the electrochemical reactions. Electrocatalysts are included to expedite the reactions and increase efficiency, but the state-of-the-art catalysts (mostly based on platinum (Pt) and iridium (Ir)) suffer from scarcity and high cost. Existing earth-abundant catalysts specify a much higher voltage to obtain similar $H_2$ production rate. In acids, electrolysis currents of about 0.6-2.0 A/cm$^2$ specify about 1.75-2.20 V using Pt and Ir. In alkaline solutions, electrolysis currents of about 0.2-0.4 A/cm$^2$ specify about 1.8-2.4 V. Stability is another important criterion for evaluating electrocatalysts. Although non-precious metal-based electrocatalysts with high activity have been developed, long term stability has not been achieved to meet the standard of commercial electrolyzers. To date, active and stable, earth-abundant electrocatalysts by facile synthesis are still highly desired.

A Ni/NiO core-shell heterostructure can afford similar activity as Pt for HER electrocatalysis. It is noted that the NiO/Ni nano-interfaces can aid in expediting HER by stabilizing H atoms on metallic Ni and releasing the generated OH$^-$ on NiO. However, an electrolyzer using NiO/Ni heterostructures may exhibit about 20 mV decay per day. Here, inspired by resistance to rusting and chemical corrosion by blocking oxygen diffusion with a surface passive film of chromium oxide ($Cr_2O_3$), Cr is introduced to form mixed $Cr_2O_3$ and NiO over-coats on Ni cores (Ni@$Cr_2O_3$—NiO). The resulting electrocatalyst (termed "CrNN") showed unprecedented high activity and stability towards HER catalysis for water splitting with or without light assistance.

Results and Discussion:

The catalyst was synthesized by hydrolysis of precursors at about 90° C., drop-drying the product to coat a Ni foam followed by annealing at about 300° C. (see Experimental Section and FIG. 26). Scanning electron microscopy (SEM) images showed well coated Ni wires in the Ni foam by a film of highly dispersed nanoparticles (FIG. 21a), in which Auger electron spectroscopy (AES) mapping indicated uniform distribution of Ni, O and Cr elements (FIG. 21a). Similar synthesis and chemical mapping results were also obtained on copper foams (FIG. 27).

With the catalyst nanoparticles sonicated off from the Ni foam, scanning transmission electron microscopy (STEM) imaging showed about 5-20 nm nanoparticles (FIG. 21b). Atomic scale electron energy-loss spectroscopy (EELS) mapping (see Experimental Section and FIG. 25 for details) revealed about 5-10 nm metallic Ni cores coated by about 1-2 nm thick layer of nickel oxide (NiO)$_x$ partitioned by about 1-2 nm chromium oxide (CrO$_x$) domains (FIG. 21c-f). Depth profiling X-ray photoelectron spectroscopy (XPS) further confirmed the +2 and +3 oxidation state of Ni and Cr respectively in the oxide layer, and the inner metallic Ni core when the oxide layer was removed by in situ Ar sputtering (FIG. 28). Thus, the structure of the catalyst was nanoscale Ni cores covered by a thin layer of mixed $Cr_2O_3$ and NiO domains or phases (FIG. 21b).

In about 1 M KOH, the CrNN electrocatalyst (loading of about 8 mg/cm$^2$) exhibited about zero overpotential at the HER onset and about 150 mV overpotential to reach a current density of about 100 mA/cm$^2$ without iR compensation, which is similar to commercial Pt/C under similar loading (FIG. 22a). Significant improvement in Tafel slope (about 111 vs. about 154 mV/decade without iR compensation) was observed over NiO/Ni hetero-structure without $Cr_2O_3$ (FIG. 22a) attributed to larger electrochemical surface area of the CrNN catalyst as indicated by the larger enclosed area of Ni$^{2+}$/Ni$^{\delta+}$ ($\delta \geq 3$) redox peak (FIGS. 23c and f).

$Cr_2O_3$ blending significantly impacts the HER stability of the CrNN catalyst. Under constant voltage operation, the NiO/Ni electrocatalyst showed a gradual decrease in current density indicating catalyst degradation, while about 10 wt % $Cr_2O_3$ greatly stabilized the catalyst with an initially increasing current density through an "activation phase" over 48 hours and a stable current density afterwards (FIG. 22b). Investigation was performed of the catalytic activity and stability of CrNN catalysts with different $Cr_2O_3$ content. A low $Cr_2O_3$ content of about 5 wt % led to slight decay in current density over HER operation but increasing the $Cr_2O_3$ content to about 20 wt % decreased the HER activity, possibly by excessive $Cr_2O_3$ coating blocking the HER active Ni sites (FIG. 29).

To glean the mechanism of stabilizing effect and initial activation stage related to $Cr_2O_3$, investigation was performed on the composition, morphology and structure of the catalyst before and after long electrolysis tests by STEM imaging and EELS mapping (FIG. 23). The NiO/Ni hetero-structures without Cr added showed significant particle oxidation into larger NiO aggregates over 24 h HER operation (FIGS. 23a and 23b), likely by oxygen dissolved in the electrolyte or oxygen migrated from counter electrodes. The activity loss was attributed to the loss of metallic Ni content and active NiO/Ni interfaces, as H adsorption sites at the NiO/Ni interface on the metallic Ni side was responsible for high HER activity of the NiO/Ni catalyst. In contrast, the CrNN catalyst showed negligible particle oxidation with almost intact NiO/Ni core structure after about 48 h electrolysis operation at about −60 mV vs. RHE (about 20-30 mA/cm$^2$) through a long stability test (FIGS. 23d and 23e). As Cr$_2$O$_3$ was chemically stable under the pH and potential range of the HER operation according to the Pourbaix diagram, the Cr$_2$O$_3$ phase served as excellent protection for the NiO/Ni heterostructures, impeding oxygen penetration to oxidize the Ni core and maintaining the NiO—Ni heterostructure for active HER catalysis.

An interesting change in the chemical structure of the catalyst was that after long HER operation, the Cr$_2$O$_3$ phase showed a tendency to co-localize with the NiO phase according to atomic scale high-resolution EELS mapping (FIG. 30). This indicated that at least part of the Cr$_2$O$_3$ phase was blended into the NiO phase to form NiCrO$_x$ surrounding the metallic Ni nano-cores.

By comparing the peak areas of Ni$^{2+}$/Ni$^{\delta+}$ ($\delta \geq 3$) redox peak before and after 48 h of HER reaction, a slightly increased electrochemical surface area is observed for the CrNN electrocatalyst (FIG. 23f), which corroborated with the activation stage during which re-arrangement of the oxide layer occurred to form NiCrO$_x$ during HER, allowing for higher accessibility of the Ni catalytic sites to the electrolyte. In contrast, the NiO/Ni catalyst without Cr$_2$O$_3$ after long HER operations showed a decreased electrochemical surface area, which corroborated with the loss of active NiO/Ni sites (FIG. 23b) and consequently the slow decay in HER activity (FIG. 23c).

Also interesting was that after long HER electrocatalysis with the CrNN catalyst, the Ni redox peak of the catalyst split into two separate peaks with one of the peaks shifting to a more positive potential, indicating two distinct Ni$^{2+}$ species in the CrNN catalyst including a more reactive one and a more inert or oxidation-resistant one (FIG. 23f). The two peaks are attributed to Ni$^{2+}$ oxidation from the metallic Ni side at the interface and Ni$^{2+}$ oxidation in the NiCrO$_x$ layer.

The metallic foam substrate was also found to impact the formation of CrNN catalyst structure. If annealed into a bulk powder form and then dispersed and loaded into Ni foam rather than annealing the precursors on the metallic foam, the product showed a much worse HER activity by about 180 mV under the same loading (FIG. 22c). Also, the same CrNN catalyst made on HER-inactive Cu foam showed almost identical performance to the one made on Ni foam, excluding the possibility of Ni foam participating as an HER active component (FIG. 22c).

To glean the role of the metallic foam substrate, EELS mapping and XPS analysis are performed of the powder annealed in bulk. EELS mapping revealed that the annealed powder contained large aggregated particles with tight coating of oxide layers on Ni nano-cores (FIG. 31). Layer by layer removal for XPS depth profiling found that more sputtering cycles were involved to expose the metallic Ni phase in the bulk powder sample, confirming thick oxide coating (FIG. 32). It is proposed that annealing of the precursors dispersed and anchored on Ni wires in the porous foam led to better dispersion of Ni@Cr$_2$O$_3$—NiO nanoparticles (FIG. 33), impeding aggregation and also affording improved electrical contacts between Ni foam and the catalyst particles.

Ni powder was intentionally added during drop drying of reaction precursors into a Ni foam, and improved electrocatalytic performance was obtained. A desirable loading of about 24 mg/cm$^2$ CrNN catalyst with about 30 wt % Ni powder in Ni foam could yield a current density of about 100 mA/cm$^2$ at an overpotential of about 115 mV without iR compensation (FIG. 22d inset). Desirably, the catalyst also exhibited stable behavior in maintaining > about 200 mA/cm$^2$ for at least about 80 hours at about −250 mV vs. RHE without iR compensation (FIG. 22d). With its superior activity and excellent stability, the CrNN catalyst holds high promise as the cathode material for water splitting and the chloralkali industry.

The CrNN HER electrocatalyst is paired with a high performance NiFe LDH oxygen evolution reaction (OER) electrocatalyst in about 1 M KOH to yield an alkaline electrolyzer. To match the loading of material on the HER side, the loading of NiFe LDH was increased to about 20 mg/cm$^2$ with addition of about 30 wt % Ni powder to improve the charge transport. At room temperature (about 23° C.), the electrolyzer impressively delivered a water splitting current at an onset voltage of about 1.46 V, and a high current density of about 200 mA/cm$^2$ at about 1.75 V without iR compensation (about 1.57 V with iR compensation) (FIG. 24b). At about 60° C., the curves shifted by about 100 mV to lower voltages with about 1.39 V onset potential and about 1.64 V at the current density of about 200 mA/cm$^2$ (about 1.50 V with iR compensation). These electrodes outperformed the Ni and stainless steel pair used in industrial alkaline electrolyzers by about 510 mV under room temperature and about 370 mV at about 60° C., corresponding to about 22.6% and about 18.4% savings of voltage and energy respectively (FIG. 24b).

The electrolyzer was stable at a current density of about 20 mA/cm$^2$ (matching the typical current density of solar cells) under a substantially constant voltage of about 1.50 V (without iR compensation) over about 500 hours (FIG. 24c). It also showed negligible decay under a high current density of about 200 mA/cm$^2$ close to that used in alkaline electrolysis industry for about 50 hours under about 1.75 V and about 1.64 V at room temperature (about 23° C.) and about 60° C. respectively (FIG. 24c).

The conversion of solar energy directly into hydrogen fuels by water photolysis is a promising route of energy conversion and storage, and the high efficiency of solar-to-hydrogen conversion could be delivered by improved water electrolyzers and solar cells. Aimed at water photolyzers with high efficiency, state-of-the-art thin-film GaAs solar cells are used. GaAs has a suitable direct band gap leading to a large open circuit voltage and a high fill factor (Table 3), which makes it desirable for powering the water electrolyzer. By connecting the electrolyzer with two GaAs solar cells in series (FIG. 24a), a high current density of about 12.10 mA/cm$^2$ (FIG. 24d) was produced, corresponding to a solar-to-hydrogen efficiency of about 14.9% under AM1.5 100 mW/cm$^2$ assuming a faradaic efficiency of about 100% (from long term stability). Interestingly, under lower power density of about 20 mW/cm$^2$ by LED desk light, the device could still deliver a current density of about 2.45 mA/cm$^2$ (FIG. 24d), corresponding to a solar-to-hydrogen efficiency of about 15.1%, which allows the use of wasted light energy for H$_2$ conversion at night. Due to the stable behavior of GaAs solar cell and the electrolyzer, the device was able to maintain almost the same current density over > about 24 hours under both sun simulator and LED desk light (FIG. 24e).

In conclusion, Cr$_2$O$_3$ blended NiO/Ni heterostructures are highly active HER catalysts with sustained H$_2$ production over long operations. The Cr$_2$O$_3$ on the surface maintains the core NiO/Ni active sites from oxidation and aggregation. Cr$_2$O$_3$ blended into NiO forms chemically inert NiCrO$_x$ during HER, which improves the HER activity and stability by inducing larger electrochemical surface area and increasing oxygen resistance. The CrNN catalyst could afford a current density of about 100 mA/cm$^2$ at about −115 mV overpotential with long term stability. Pairing of the HER catalyst with NiFe LDH anode provides water electrolyzer and photolyzer with superior efficiency and stability.

Experimental Section

Synthesis of Ni@$Cr_2O_3$—NiO (CrNN) Catalyst:

In a typical synthesis of CrNN (about 10 wt % $Cr_2O_3$) on Ni foam substrate, about 800 µl of about 0.2 M nickel acetate (Ni(OAc)$_2$, Sigma Aldrich) and about 32 µl of about 0.5 M chromium nitrate (Cr(NO$_3$)$_3$, Sigma Aldrich) aqueous solutions were added to about 8 ml anhydrous dimethylformamide (DMF, Fisher Scientific) to form a light green solution. The solution turned into a yellow suspension, while vigorously stirred in an oil bath maintained at about 90° C. for about 4 hours. Upon addition of Cr(NO$_3$)$_3$ precursor, Ni(OAc)$_2$ was hydrolyzed into a NiCr layered double hydroxide (LDH) with partially substituted $Ni^{2+}$ by $Cr^{3+}$. The suspension was then centrifuged and washed with ethanol to remove DMF. Due to the tiny grain sizes (FIG. 26a), the re-suspended NiCr LDH ethanol solution could be sonicated (for about 20 minutes) to obtain a light yellow clear solution (FIGS. 26b and 26c), which was then drop-dried into about 1 cm×about 1 cm Ni foam (about 2-mm thick, about 100 ppi, about 95% porosity, Marketech) at about 90° C. Afterwards, the coated Ni foam was annealed in a tube furnace at about 300° C. under about 100 sccm Ar flow to maintain a pressure of about 1.5 torr. To get rid of the water and $O_2$ generated during the decomposition process, the system was constantly pumped during the reaction. After cooling down to room temperature in about 30 minutes, the electrodes were ready to use. The weight of the catalyst active mass on the electrode was determined by the difference in Ni foam weight before loading and after annealing.

CrNN with different $Cr_2O_3$ contents on Ni foam substrate were synthesized by typical procedures with different amount of Cr(NO$_3$)$_3$ precursors.

CrNN catalysts on Cu foam/graphite-coated Ni foam were produced by the same synthesis using Cu foam/graphite-coated Ni foam as the substrate.

The catalyst electrode with Ni powder was synthesized by identical procedure with addition of about 30 wt % Ni powder (about 20 nm, partially passivated, US Research Nanomaterials, Inc.) before sonication of NiCr LDH in ethanol.

CrNN bulk powder was synthesized using the same oil bath step. The suspension was centrifuged and washed with water repetitively to remove DMF. The re-suspended aqueous solution was then lyophilized to obtain solid powder. The powder was annealed under the same condition of about 1.5 torr Ar at about 300° C. for about 1 hour. The electrode was produced by drop-drying catalyst suspension in ethanol with about 3 wt % PTFE (from its 60 wt % aqueous suspension, Aldrich) into about 1 cm×about 1 cm Ni foam. Due to the severe particle aggregation, the electrode was further annealed at about 1.5 torr Ar, about 300° C. for about 1 hour to ensure good contact between the catalyst and Ni foam substrate in order for minimal material fall-off during bubbling.

Synthesis of NiFe LDH Catalyst:

In a typical synthesis, about 3.2 ml of about 0.5 M Ni(OAc)$_2$ aqueous solution and about 640 µl of about 0.5 M iron nitrate (Fe(NO$_3$)$_3$, Sigma Aldrich) were added to about 80 ml DMF. The mixed solution was sealed in an autoclave and heated at about 120° C. for about 16 hours followed by about 160° C. for about 2 hours. After cooling down to room temperature, the suspension was collected, centrifuged and washed with ethanol repetitively to get rid of DMF. The NiFe LDH was finally re-suspended in ethanol for use. To prepare OER catalyst electrode, about 30 wt % Ni powder were added to NiFe LDH ethanol suspension and sonicated to form a uniform suspension for about 20 min. The NiFe LDH/Ni powder suspension was then drop-dried into the Ni foam at about 90° C. The weight of the catalyst active mass on the electrode was determined by the difference in Ni foam weight before loading and after loading.

Preparation of Pt/C Electrode:

About 20 wt % Pt on Vulcan carbon (Fuel Cell Store) was used for comparison. About 8 mg Pt/C was mixed with about 3 wt % PTFE in ethanol by sonication for 30 minutes. The suspension was then drop-dried into Ni foam at about 90° C.

Materials Characterizations:

The catalysts on metallic foam substrate were directly used for X-ray photoelectron spectroscopy (XPS), scanning electron microscropy (SEM), and Auger electron spectroscopy (AES) measurements. For bulk powder, samples were drop-dried onto silicon substrate. XPS analysis was carried out on a PHI VersaProbe Scanning XPS Microprobe. SEM images were taken by an FEI XL30 Sirion scanning electron microscope. AES spectra and mapping were taken by a PHI 700 Scanning Auger Nanoprobe operating at about 10 nA and about 10 kV. UV-vs absorbance spectrum was measured using a Varian Cary 300 Scan UV-Visible Spectrometer.

Aberration corrected STEM imaging and EELS mapping were performed on a Nion UltraSTEM-100, operated at about 100 kV. Bright field (BF) and annular dark field (ADF) images were acquired simultaneously using the BF and ADF detectors. Due to the partial overlapping of the oxygen K-edge (at about 532 eV) and the Cr L-edge (at about 575 eV), the $Cr_2O_3$ maps were obtained by multiple linear least squares (MLLS) fitting the as-acquired spectrum imaging in the 480-620 eV energy-loss range with oxygen K-edge fine structure from NiO and oxygen K-edge plus Cr L-edge from $Cr_2O_3$ references, all acquired under the same experimental conditions (FIG. 25a). This fitting also generated maps of the NiO component based on the oxygen K-edge fine structure of NiO. The Ni and NiO maps were obtained by fitting the as-acquired spectrum imaging in the 840-900 eV energy-loss range with Ni L-edge (at about 855 eV) fine structures taken from Ni and NiO references (FIG. 25b). The NiO maps obtained from Ni-L edge fitting and O-K edge fitting were compared to make sure that both fittings generate the same NiO maps. The fitting residuals were examined to make sure that the residuals are in the noise level.

Electrochemical Measurement:

HER catalytic activity and stability were measured in a standard three electrode configuration by a CHI 760D electrochemistry workstation. CrNN catalysts typically at loadings of about 8 mg/$cm^2$ were used as working electrode, graphite rod was used as counter electrode, silver/silver chloride (Ag/AgCl, 1M KCl) was used as reference electrode and about 1 M potassium hydroxide (1 M KOH) was used as electrolyte. The reference was converted to reversible hydrogen electrode (RHE). Linear Sweep Voltammetry at about 1 mV/s was carried out to measure the HER activity, and chronoamperometry was utilized for HER stability measurement. All curves are not iR-compensated with about 0.5 ohm resistance. Due to the vigorous bubble evolution during high current measurement, the electrodes were kept about 1 cm apart to avoid crossover current. Water electrolysis measurement was performed in a standard two electrode configuration. Linear Sweep Voltammetry at about 1 mV/s was utilized to measure the water splitting activity, and chronopotentiometry at constant current densities of about 20 mA/cm$^2$ and about 200 mA/cm$^2$ was performed for water splitting stability.

The i-V curves of GaAs thin film solar cell (from Alta Device) were measured at about 100 mV/s under 1 sun AM 1.5 illumination (by a 150 W Xenon lamp from Newport Corporation) and under LED desk light. The power density of the desk light was measured with a Thorlabs PMT50 powder meter to be 20±1 mW/cm$^2$. About 5.36 cm$^2$ GaAs solar cell was utilized in 1 sun AM 1.5 measurement due to non-uniform distribution of power in larger area solar cell, and about 17 cm$^2$ GaAs solar cell was utilized in LED desk light experiment. Long term stability measurement was carried out by connecting the solar cell in series with CHI760D electrochemical station and performing constant voltage measurement with 0 V provided by the electrochemical station. No bubbles or current was observed in the absence of illumination.

TABLE 3

Parameters of the GaAs solar cell from Alta Device

|  | Voc (V) | Isc (mA/cm$^2$) | Fill factor (%) |
|---|---|---|---|
| GaAs solar cell | 2.06 | 12.2 | 80.3 |

Example 3

Synthesis of Ni@Cr$_2$O$_3$—NiO Catalyst

In a typical synthesis, about 0.2 M nickel acetate (Ni(OAc)$_2$) and about 0.5 M chromium nitrate (Cr(NO$_3$)$_3$) aqueous solutions are mixed (volume ratio of Ni(OAc)$_2$ to Cr(NO$_3$)$_3$ is about 40:1). The resulting mixture is allowed to settle for at least about 30 minutes and is then vigorous stirred to form a uniform suspension. A Ni foam is soaked in the suspension and dried at about 120° C. The process is repeated until all of the suspension is used. The Ni foam is pre-rinsed with ethanol before every soaking process. The coated Ni foam is annealed in a tube furnace at about 300° C. for about 1 hour under about 100 sccm Ar flow to maintain a pressure of about 1.5 torr. The system is constantly pumped during the reaction.

Example 4

Synthesis and Characterization of Ni@Cr$_2$O$_3$—NiO HER Electrodes

Synthesis of Ni@NiO—Cr$_2$O$_3$ (CrNN) HER Electrode:
To fabricate a CrNN electrode on about 1×about 1 cm Ni foam, an aqueous precursor solution was firstly made by mixing about 1.6 mL of about 0.2 M Nickel acetate (Ni(OAc)$_2$) and about 64 μl of about 0.5 M chromium nitrate (Cr(NO$_3$)$_3$) aqueous solutions. Before coating the precursor solution onto the Ni foam, the Ni foam should be wetted by ethanol. Then the wetted Ni foam was fully soaked in the as-prepared aqueous precursor solution for several minutes; after dried by baking at about 90° C., the procedure of wetting by ethanol and soaking in the precursor solution is repeated until consuming the precursor solution. Dropdrying the precursor solution at about 90° C. instead of soaking also can be performed. Afterwards, the coated Ni foam was annealed in a tube furnace at about 300° C. under about 100 sccm Ar flow to maintain a pressure of about 1.5 torr. After cooling down to room temperature in about 30 minutes, the electrode was ready to use.

Scale Up Electrode to 2×2 cm and 3×3 cm:
Compared to the 1×1 cm electrode, precursor amounts for 2×2 cm and 3×3 cm electrodes were increased by about 4 times and about 9 times, respectively. The electrochemical measurements of chronoamperometry curves (FIG. 34) and linear sweep voltammetry curves (FIG. 35) were carried out to investigate the stability and activity of electrodes in a standard three electrode configuration, respectively. CrNN electrode was used as working electrode, a bare Ni foam was used as counter electrode, silver/silver chloride (Ag/AgCl, 1M KCl) was used as reference electrode and about 1 M potassium hydroxide (about 1 M KOH) was used as electrolyte. It was observed that the larger-sized electrode produces lower current density in stability measurements (FIG. 34) and lower activity (FIG. 35), possibly due to the increase of inner resistance.

Developing Aqueous Precursor Solution with High Concentration:
A precursor solution with a higher concentration of a Ni-containing precursor was developed. The procedure for 2×2 cm electrode includes mixing about 2 mL of about 0.64 M Nickel acetate (Ni(OAc)$_2$) and about 252 μl of about 0.5 M chromium nitrate (Cr(NO$_3$)$_3$) aqueous solutions, and was compared to a lower concentration precursor solution obtained by mixing about 6.4 mL of about 0.2 M Nickel acetate (Ni(OAc)$_2$) and about 252 μl of about 0.5 M chromium nitrate (Cr(NO$_3$)$_3$) aqueous solutions. By comparing stability performance (FIG. 36) of 2×2 cm electrodes wetted by ethanol in fabrication, the electrode using the higher concentration ("new") precursor solution gives higher stability current relative to the lower concentration ("old") precursor solution. Furthermore, using the higher concentration precursor solution can simplify electrode fabrication process by decreasing soaking frequency.

Using Triton X-100 to Wet Ni Foam and Adding Ni Powder into Precursor Solution:
For electrode fabrication, ethanol is typically used to wet a hydrophobic Ni foam before soaking the Ni foam in an aqueous precursor solution. In order to simplify the process, a nonionic surfactant, Triton X-100 (polyethylene glycol p-(1,1,3,3-tetramethylbutyl)-phenyl ether), was introduced, which is used a single time in the beginning of the fabrication process. Although the stability current (FIG. 37) and activity (FIG. 38) decreased a little, the fabrication process was simplified. After adding Ni powder into the precursor solution (about 5 mg/cm$^2$), the electrode wetted by about 0.01% aqueous Triton X-100 solution exhibited the same level of performance as an electrode wetted by ethanol.

Zinc Doping Effect for HER:
The zinc effect for HER based on 1×1 cm Ni and Cu foams was investigated. About 20% (molar) zinc acetate (Zn(OAc)$_2$) was added into a precursor solution. The introduction of zinc doping was observed to improve stability current (FIG. 39) and HER activity (FIG. 40) for both Ni and Cu foams. In addition, Ni foam was observed to exhibit better performance than Cu foam.

As used herein, the singular terms "a," "an," and "the" include plural referents unless the context clearly dictates otherwise. Thus, for example, reference to an object can include multiple objects unless the context clearly dictates otherwise.

As used herein, the terms "connect," "connected," "connecting," and "connection" refer to an operational coupling or linking Connected objects can be directly coupled to one another or can be indirectly coupled to one another, such as through another set of objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations is not a limitation of this disclosure.

What is claimed is:

1. An electrode for water splitting production, comprising:
a porous substrate; and
an electrocatalyst affixed to the porous substrate, the electrocatalyst including hetero structures of a first material and a second material that partially covers the first material,
wherein the first material and the second material include a first metal and a second metal, respectively,
wherein the first metal and the second metal have different oxidation states,
wherein the first metal and the second metal are the same transition metal,
wherein the heterostructures are nanoparticles having sizes in a range from 1 nm to 200 nm, and
wherein the second material includes a third metal that is different from the first metal and the second metal, and the first material does not include the third metal.

2. The electrode of claim 1, wherein the transition metal is nickel.

3. The electrode of claim 1, wherein the first metal and the third metal are different transition metals.

4. The electrode of claim 3, wherein the first metal is nickel, the second metal is nickel, and the third metal is chromium.

5. The electrode of claim 1, wherein the porous substrate has a porosity in the range of 0.3 to 0.98.

6. The electrode of claim 1, wherein the porous substrate is a metallic foam or a non-metallic foam.

7. The electrode of claim 1, wherein the porous substrate is selected from a nickel foam, a copper foam, a carbon foam, a graphite foam, a carbon fiber paper, a carbon nanotube network, a graphene foam, a titanium foam, and an aluminum foam.

8. The electrode of claim 1, wherein the porous substrate defines voids, and the electrocatalyst is disposed in the voids of the porous substrate.

9. The electrode of claim 1, wherein the first metal has an oxidation state of 0, and the second metal has an oxidation state of +2.

10. The electrode of claim 1, wherein the first metal has an oxidation state of 0, the second metal has an oxidation state of +2, and the third metal has an oxidation state of +3.

11. The electrode of claim 4, wherein the first metal is nickel having an oxidation state of 0, the second metal is nickel having an oxidation state of +2, and the third metal is chromium having an oxidation state of +3.

12. The electrode of claim 4, wherein the second material includes an oxide of the second metal and an oxide of the third metal.

13. The electrode of claim 1, wherein each heterostructure includes a core of the first material and an incomplete shell of the second material partially covering the core of the first material, the incomplete shell includes an oxide of the second metal and an oxide of the third metal, and the oxide of the second metal and the oxide of the third metal are segregated into separate domains.

14. An electrode for water splitting production, comprising:
a porous substrate; and
an electrocatalyst affixed to the porous substrate, the electrocatalyst including heterostructures of a first material and a second material that partially covers the first material, wherein each heterostructure includes a core of the first material and an incomplete shell of the second material partially covering the core of the first material, the core includes a first metal that is nickel having an oxidation state of 0, the incomplete shell includes an oxide of a second metal and an oxide of a third metal, the third metal is different from the first metal and the second metal, and the core does not include the third metal.

15. The electrode of claim 14, wherein the second metal is nickel, and the third metal is chromium.

16. The electrode of claim 14, wherein the hetero structures are nanoparticles having sizes in a range from 1 nm to 200 nm.

17. The electrode of claim 14, wherein the incomplete shell has a thickness in a range of 1 nm to 2 nm.

18. The electrode of claim 14, wherein the oxide of the second metal and the oxide of the third metal are segregated into separate domains.

19. The electrode of claim 15, wherein the core is a nickel core, and the incomplete shell includes nickel oxide and chromium oxide.

20. A water electrolyzer comprising:
an anode;
a cathode; and
a power supply electrically connected to the anode and the cathode,
wherein the cathode includes
  (1) a porous substrate; and
  (2) an electrocatalyst affixed to the porous substrate, the electrocatalyst including hetero structures of a first material and a second material that partially covers the first material,
  wherein the first material and the second material include a first metal and a second metal, respectively,
  wherein the first metal and the second metal have different oxidation states,
  wherein the first metal and the second metal are the same transition metal, and
  wherein the second material includes a third metal that is different from the first metal and the second metal, and the first material does not include the third metal.

21. The water electrolyzer of claim 20, wherein the transition metal is nickel.

22. The water electrolyzer of claim 20, wherein the first metal is nickel, the second metal is nickel, and the third metal is chromium.

* * * * *